United States Patent
Kondo et al.

(10) Patent No.: US 7,667,770 B2
(45) Date of Patent: Feb. 23, 2010

(54) METHOD AND APPARATUS FOR PROCESSING INFORMATION, STORAGE MEDIUM, AND PROGRAM

(75) Inventors: Tetsujiro Kondo, Tokyo (JP); Naoki Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 636 days.

(21) Appl. No.: 10/612,238

(22) Filed: Jul. 2, 2003

(65) Prior Publication Data

US 2004/0070685 A1   Apr. 15, 2004

(30) Foreign Application Priority Data

Jul. 3, 2002   (JP)   ............... 2002-195046

(51) Int. Cl.
*H04N 7/01* (2006.01)
*H04N 11/20* (2006.01)
*H04N 5/44* (2006.01)

(52) U.S. Cl. ............... 348/441; 348/445; 348/553; 348/734

(58) Field of Classification Search ............... 348/441, 348/445, 553, 556, 580–582, 602
See application file for complete search history.

(56) References Cited

U.S. PATENT DOCUMENTS

| | | | | |
|---|---|---|---|---|
| 5,517,588 | A | | 5/1996 | Kondo |
| 5,852,470 | A | * | 12/1998 | Kondo et al. ............... 348/448 |
| 5,920,354 | A | * | 7/1999 | Fedele ............... 348/446 |
| 5,946,044 | A | * | 8/1999 | Kondo et al. ............... 348/458 |
| 6,040,867 | A | * | 3/2000 | Bando et al. ............... 375/240.27 |
| 6,188,439 | B1 | * | 2/2001 | Kim ............... 348/553 |
| 6,297,855 | B1 | * | 10/2001 | Kondo et al. ............... 348/663 |
| 6,340,992 | B1 | * | 1/2002 | Markandey ............... 348/556 |

(Continued)

FOREIGN PATENT DOCUMENTS

EP   0682452   * 11/1995

(Continued)

OTHER PUBLICATIONS

Patent Abstracts of Japan, Publication No. 2003-224830, Publication Date Aug. 8, 2003.

(Continued)

*Primary Examiner*—Brian P Yenke
(74) *Attorney, Agent, or Firm*—Frommer Lawrence & Haug LLP; William S. Frommer; Thomas F. Presson

(57) ABSTRACT

In a television set, image quality is adjusted in accordance with parameters calculated on the basis of adjustment values used in the past, depending on a feature of an image and an environmental status. A weight calculator determines a weight depending on the manner in which a user performs a volume control operation. A cumulative weight memory outputs a cumulative weight corresponding to the feature value. Output volume values used in past are stored in a volume value generator. The volume value generator calculates output volume values corresponding to a feature value on the basis of parameters indicating final adjustment values, the feature value, the weight, and the cumulative weight. The calculated volume values are stored in the volume value generator. Under the control of a system controller, the volume values stored in the volume value generator are output to a coefficient generator.

16 Claims, 17 Drawing Sheets

U.S. PATENT DOCUMENTS

| | | | |
|---|---|---|---|
| 6,342,925 B1 * | 1/2002 | Akhavan et al. | 348/563 |
| 6,456,340 B1 * | 9/2002 | Margulis | 348/745 |
| 6,522,313 B1 * | 2/2003 | Cottone | 345/22 |
| 6,591,398 B1 * | 7/2003 | Kondo et al. | 714/2 |
| 6,690,425 B1 * | 2/2004 | Worrell | 348/445 |
| 6,985,186 B2 * | 1/2006 | Kondo et al. | 348/441 |
| 7,003,792 B1 * | 2/2006 | Yuen | 725/46 |
| 7,113,225 B2 * | 9/2006 | Kondo et al. | 348/571 |
| 2002/0021365 A1 * | 2/2002 | Yang et al. | 348/445 |
| 2002/0135594 A1 | 9/2002 | Kondo et al. | |
| 2002/0163592 A1 * | 11/2002 | Ueda | 348/602 |
| 2003/0164896 A1 * | 9/2003 | Kondo et al. | 348/441 |
| 2003/0214603 A1 * | 11/2003 | Manning | 348/445 |
| 2006/0145756 A1 * | 7/2006 | Lee et al. | 330/10 |
| 2006/0242665 A1 * | 10/2006 | Knee et al. | 725/38 |
| 2007/0024757 A1 * | 2/2007 | Kondo et al. | 348/602 |

FOREIGN PATENT DOCUMENTS

| | | | |
|---|---|---|---|
| EP | 1134972 | * | 9/2001 |
| JP | 7 222078 | | 8/1995 |
| JP | 8 123385 | | 5/1996 |
| JP | 8 298627 | | 11/1996 |
| JP | 9 37174 | | 2/1997 |
| JP | 9-261549 | | 10/1997 |
| JP | 11-232726 | | 8/1999 |
| JP | 11-345446 | | 12/1999 |
| JP | 2001-103406 | | 4/2001 |
| JP | 2002-159077 | | 5/2002 |
| JP | 2002-185912 | | 6/2002 |
| JP | 2003 196970 | | 7/2003 |
| WO | WO-98/21877 | * | 5/1998 |
| WO | WO 01 17250 | | 3/2001 |
| WO | WO 01 63921 | | 8/2001 |
| WO | WO 02 03682 | | 1/2002 |

OTHER PUBLICATIONS

Patent Abstracts of Japan, Publication No. 2003-339063, Publication Date Nov. 28, 2003.

Patent Abstracts of Japan, Publication No. 2004-040498, Publication Date Feb. 5, 2004.

Patent Abstracts of Japan, Publication No. 056630, Publication Date Feb. 19, 2004.

Patent Abstracts of Japan, Publication No. 2003-224797, Publication Date Aug. 8, 2003.

Patent Abstract of Japan, Publication No. 2003-224798, Publication Date Aug. 8, 2003.

Patent Abstracts of Japan, application No. 2000-047947, Feb. 24, 2000, Publication No. 2001-238185, Publication date Aug. 31, 2001.

Patent Abstracts of Japan, application No. 2000-124796, Apr. 25, 2000, Publication No. 2001-309315, Publication date Nov. 2, 2001.

Patent Abstracts of Japan, application No. 2000-124794, Apr. 25, 2000, Publication No. 2001-309314, Publication date Nov. 2, 2001.

Patent Abstracts of Japan, application No. 09-121257, May 12, 1997, Publication No. 10-313445, Publication date Nov. 24, 1998.

Patent Abstracts of Japan, application No. 06-293963, Nov. 2, 1994, Publication No. 08-130744, Publication date May 21, 1996.

* cited by examiner

METHOD AND APPARATUS FOR PROCESSING INFORMATION, STORAGE MEDIUM, AND PROGRAM

BACKGROUND OF THE INVENTION

1. Field of the Invention

The present invention relates to a method and apparatus for processing information, a recording medium, and a program, and more particularly, to a method and apparatus for processing information, a recording medium, and a program, which allow a user to make an adjustment associated with content data such as an image in accordance with user's preference.

2. Description of the Related Art

In recent years, there has been a need for a high-performance audio/visual system. In response to such a need, a high-performance television system called "high vision" (trademark) having the capability of displaying a higher-resolution image than can be obtained in conventional television sets have been developed. In the high vision television system, in contrast to the NTSC television system in which 525 scanning lines are used, as many as 1125 scanning lines are used. That is, the number of scanning lines used in the high vision television system is greater than twice the number of scanning lines used in the NTSC television system. Furthermore, in the high vision television system, unlike the NTSC television system in which the screen aspect ratio is 3:4, the screen aspect ratio is 9:16, which makes it possible to display a more realistic image with higher resolution than can be achieved by the NTSC television system.

Although the high vision television system has advantages described above, when a conventional NTSC video signal is directly supplied to a high vision television set, the high vision television set cannot display it in the high vision format because of the above-described differences in specifications between the NTSC television system and the high vision television system.

In view of the above, the applicant for the present invention has proposed (in Japanese Unexamined Patent Application Publication No. 8-51599) a converter for converting a NTSC video signal into a high vision video signal thereby allowing an image corresponding to the NTSC video signal to be displayed in the high vision form. In this converter, for pixel data at a location of interest in a high vision video signal, pixel data in a block (area) at a location corresponding to the location of interest in the high vision video signal are extracted from a given NTSC video signal. A class of the pixel data at the location of interest is determined on the basis of a level distribution pattern of the extracted pixel data in the block. The specific value of the pixel data at the location of interest is then determined in accordance with the determined class.

However, in the converter described above, the resultant image displayed in the high vision format has a fixed resolution, and a user cannot adjust parameters such as contrast or sharpness associated with the resolution, depending on the content of the image in accordance with user's preference.

To avoid the above problem, the applicant for the present invention has further proposed (in Japanese Unexamined Patent Application Publication No. 2001-238185) a NTSC-to-high vision video signal conversion technique in which a high vision video signal is generated in accordance with values of parameters specified by a user thereby allowing the user to adjust the resolution of an image displayed in accordance with the resultant high vision video signal.

Although this video signal conversion technique allows a user to adjust the resolution of the image in accordance with user's preference, the technique has a further problem. For example, in a case in which a desirable resolution varies depending on whether an image has a bright color tone or dark color tone, the user has to adjust the resolution each time the color tone varies. This is very troublesome to the user. Furthermore, in a case in which there are two or more parameters associated with image quality, if one parameter is adjusted, the adjustment of the one parameter can influence other parameters, and thus it is needed to readjust other parameters which have already been adjusted. Thus, it is difficult to quickly achieve a desired result in the adjustment.

SUMMARY OF THE INVENTION

In view of the above, an object of the present invention is to provide a technique which allows a user to easily and quickly make an adjustment associated with an image.

To achieve the above object, the present invention provides a first information processing apparatus comprising processing means for processing content data, acquisition means for acquiring first information for controlling the processing means, and generation means for generating second information using a value obtained by weighting the first information acquired by the acquisition means, wherein the processing means processes the content data on the basis of the second information generated by the generation means.

The first information processing apparatus may further comprise input means for receiving a command/data issued by a user, wherein the acquisition means may acquire, as the first information, an adjustment value input by the user via the input means, and the processing means process the content data such that when an automatic adjustment command is input by the user via the input means, the processing means processes the content data on the basis of the second information generated by the generation means, while in the case in which the automatic adjustment command is not issued by the user via the input means, when the adjustment value is input by the user via the input means, the processing means processes the content data on the basis of the first information acquired by the acquisition means.

The first information apparatus may further comprise feature detection means for detecting features of the content data, wherein the generation means may generate second information for each feature detected by the feature detection means for the content data, and the processing means may process the content data using the second information corresponding to the feature of the content data detected by the feature detection means.

The feature detection means may detect, as a feature of the content data, the variance of image levels.

The feature detection means may detect, as a feature of the content data, the mean image level.

The first information processing apparatus may further comprise environmental information detection means for detecting environmental information associated with an environmental condition, wherein the generation means may generate second information for each piece of environmental information detected by the environmental information detection means, and the processing means may process the content data using second information corresponding to the environmental information detected by the environmental information detection means.

The environmental information detection means may detect, as the environmental information, the temperature in the ambient.

The environmental information detection means may detect, as the environmental information, the humidity in the ambient.

The environmental information detection means may detect, as the environmental information, the brightness of a light in the ambient.

The first information processing apparatus may further comprise information extraction means for extracting information associated with the content data, wherein the generation means may generate second information for each piece of information extracted by the information extraction means, and the processing means may process the content data using second information corresponding to the information extracted by the information extraction means.

The first information processing apparatus may further comprise storage means for storing the second information generated by the generation means.

The storage means may be formed such that it can be removed from the information processing apparatus.

The present invention also provides a first information processing method comprising the steps of processing the content data, acquiring first information for controlling the processing step, and generating second information using a value obtained by weighting the first information acquired in the acquisition step, wherein in the processing step, the content data is processed on the basis of the second information generated in the generation step.

The present invention also provides a first storage medium including a program stored thereon comprising the steps of processing the content data, acquiring first information for controlling the processing step, and generating second information using a value obtained by weighting the first information acquired in the acquisition step, wherein in the processing step, the content data is processed on the basis of the second information generated in the generation step.

The present invention also provides a first program comprising the steps of processing the content data, acquiring first information for controlling the processing step, and generating second information using a value obtained by weighting the first information acquired in the acquisition step, wherein in the processing step, the content data is processed on the basis of the second information generated in the generation step.

The present invention also provides a second information processing apparatus comprising processing means for processing content data, acquisition means for acquiring first information and second information for controlling the processing means, detection means for detecting a relationship between the first information and the second information acquired by the acquisition means, and generation means for generating third information and fourth information by converting the first information and the second information in accordance with the relationship detected by the detection means, wherein the processing means processes the content data in accordance with the relationship detected by the detection means and the third information and fourth information generated by the generation means.

The detection means may detect the relationship between the first information and the second information, by using a linear expression.

The detection means may detect the relationship between the first information and the second information, by using a high-order expression.

The detection means may detect the relationship between the first information and the second information, by using a vector quantization table and vector quantization codes.

The detection means may calculate coordinate axes on the basis of the detected relationship between the first information and the second information, and the detection means may produce a conversion table used to generate the third information and the fourth information by converting the first information and the second information, respectively. The generation means may generate the third information and the fourth information by converting the first information and the second information on the basis of the conversion table generated by the detection means.

The second information processing apparatus may further comprise display control means for controlling displaying of information other than the content data, wherein the display control means may control displaying of coordinates of the third information and the fourth information generated by the generation means along the coordinate axes calculated by the detection means.

The second information processing apparatus may further comprise storage means for storing the conversion table generated by the detection means.

The second information processing apparatus may further comprise storage means for storing the third information and the fourth information generated by the generation means.

The detection means may detect the relationship between the first and the second information, when a greater number of pieces of third information and fourth information than a predetermined number are stored in the storage means.

The storage means may be formed such that it can be removed from the information processing apparatus.

The second information processing apparatus may further comprise input means for receiving a command/data issued by a user, wherein the detection means may detect the relationship between the first information and the second information in response to receiving a command to produce new coordinate axes issued by a user.

The present invention also provides a second information processing method comprising the steps of processing the content data, acquiring first information and second information for controlling the processing step, detecting a relationship between the first information and the second information acquired in the acquisition step, and generating third information and fourth information by converting the first information and the second information in accordance with the relationship detected in the detection step, wherein in the processing step, the content data is processed in accordance with the relationship detected in the detection step and the third information and fourth information generated in the generation step.

The present invention also provides a second storage medium including a program stored thereon comprising the steps of processing the content data, acquiring first information and second information for controlling the processing step, detecting a relationship between the first information and the second information acquired in the acquisition step, and generating third information and fourth information by converting the first information and the second information in accordance with the relationship detected in the detection step, wherein in the processing step, the content data is processed in accordance with the relationship detected in the detection step and the third information and fourth information generated in the generation step.

The present invention also provides a second program comprising the steps of processing the content data, acquiring first information and second information for controlling the processing step, detecting a relationship between the first information and the second information acquired in the acquisition step, and generating third information and fourth information by converting the first information and the second information in accordance with the relationship detected in the detection step, wherein in the processing step, the content data is processed in accordance with the relationship detected in the detection step and the third information and fourth information generated in the generation step.

In the first information processing apparatus, the first information processing method, and the first program, content data is processed in such a manner that first information for controlling the processing means is acquired, second information is generated using a value obtained by weighting the first information acquired by the acquisition means, and the content data is processed on the basis of the generated second information.

In the second information processing apparatus, the second information processing method, and the second program, content data is processed in such a manner that first information and second information for controlling the processing means are acquired, a relationship between the first information and the second information is detected, third information and fourth information are generated by converting the first information and the second information in accordance with the detected relationship, and the content data is processed in accordance with the detected relationship and the generated third information and fourth information.

DESCRIPTION OF THE PREFERRED EMBODIMENTS

The present invention is described in further detail below with reference to preferred embodiments in conjunction with the accompanying drawings.

Figure 1:
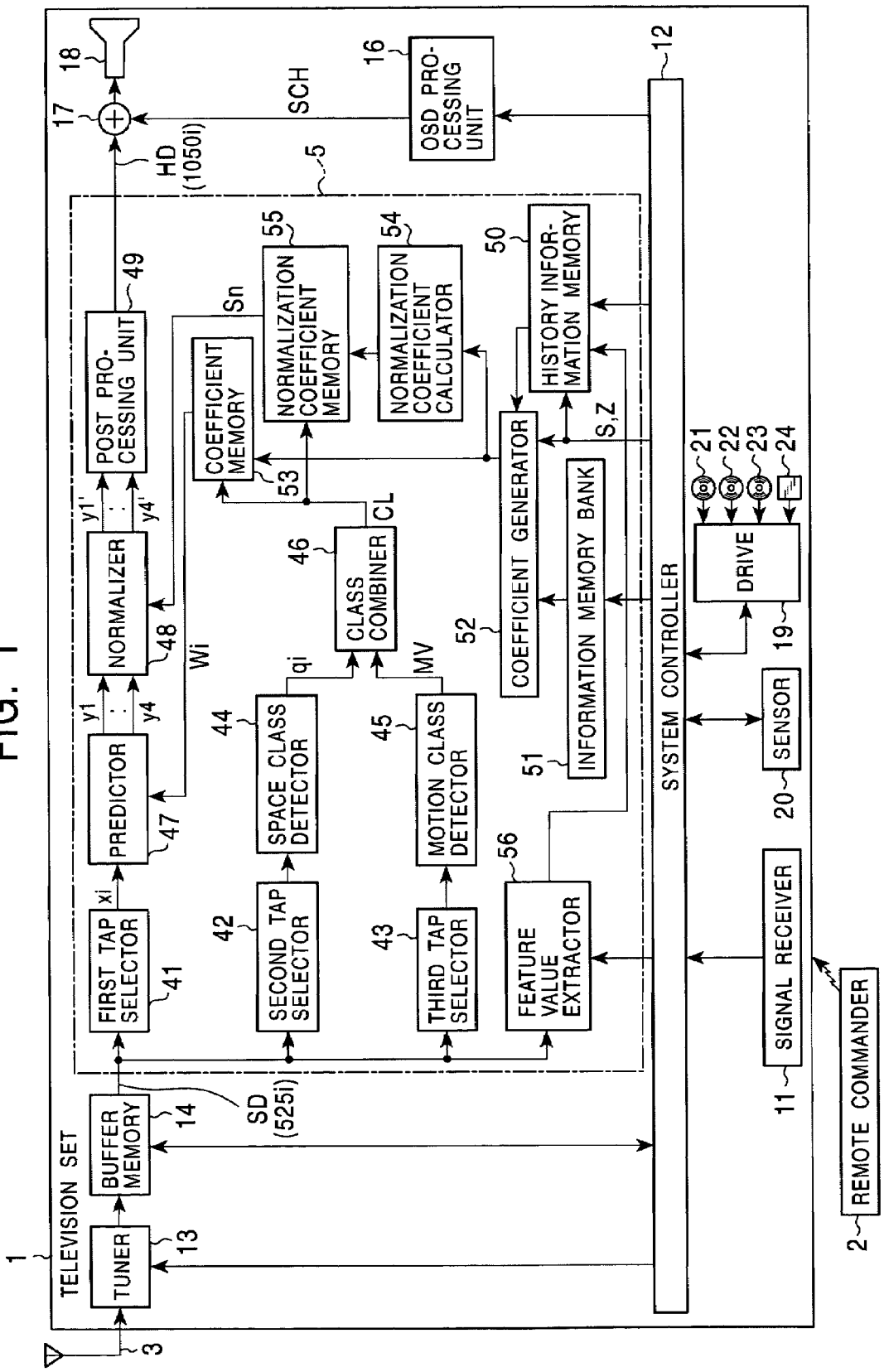
FIG. 1 is a block diagram showing the construction of a television set according to the present invention.

FIG. 1 is a block diagram showing the construction of a television set 1. When the television set 1 acquires a 525i SD (Standard Definition) signal from a broadcast signal, the television set 1 converts the acquired 525i signal into a 1050i HD (High Definition) signal and displays an image in accordance with the HD signal. Herein, numerals of "515i" and "1050i" each denote the number of scanning lines, and "i" denotes "interlace".

Figure 2:
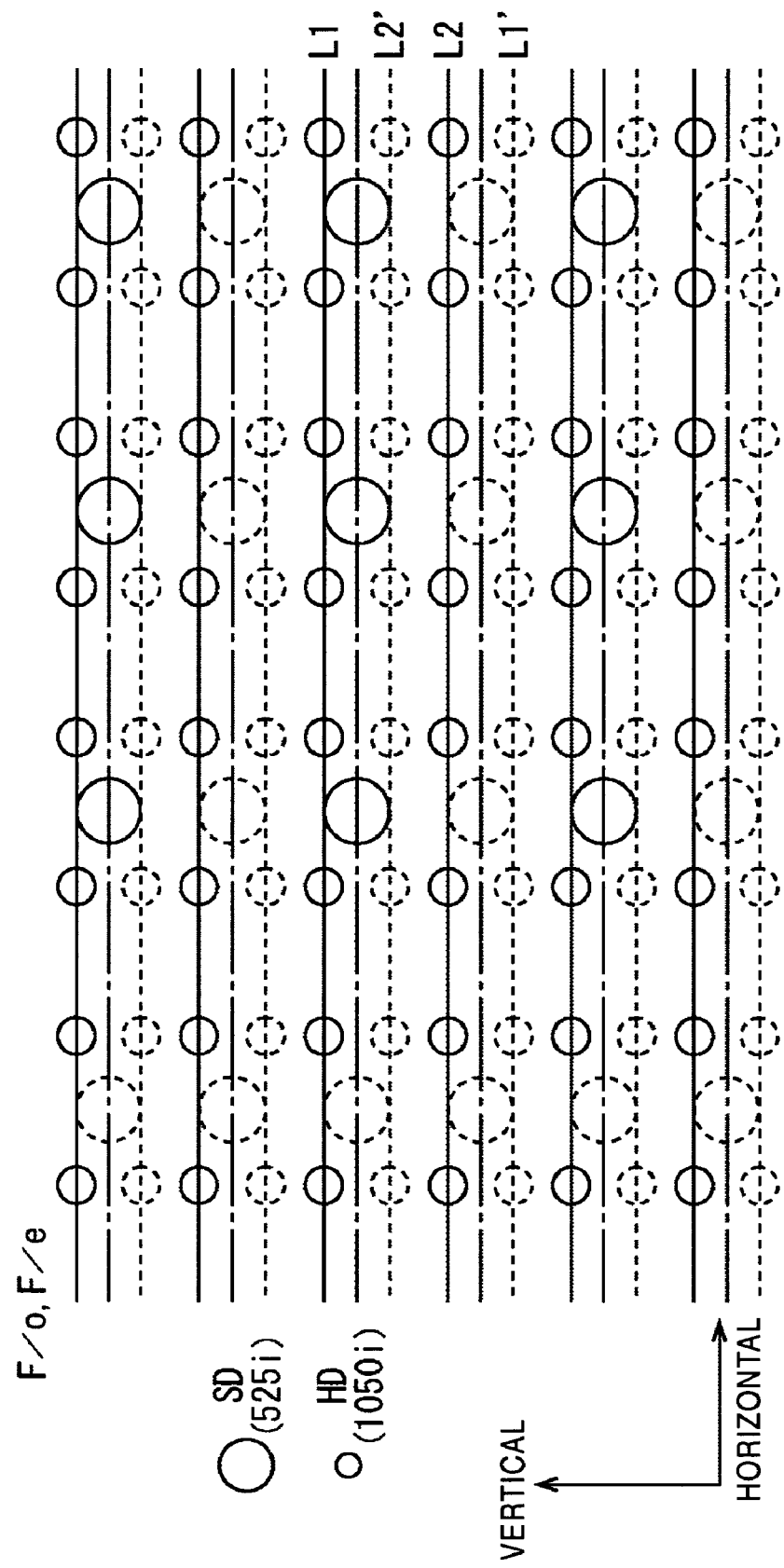
FIG. 2 is a diagram showing locations of pixels of a 525i signal and those of a 1050i signal.

FIG. 2 shows locations of pixels in a certain frame (F) for both a 525i signal and a 1050i signal. In FIG. 2, solid lines represent pixel locations in an odd (o) field, and dashed lines represent pixel locations in an even (e) field. Pixels of the 525i signal are indicated by greater dots, and pixel of the 1050i signal are indicated by smaller dots. As can be seen from FIG. 2, pixel data of the 1050i signal includes line data such as L1 and L1' located close to 525i signal lines and line data such as L2 and L2' located less close to 525i signal lines, wherein L1 and L2 indicate typical line data in the odd field, and L1' and L2' indicate typical line data in the even field. Each line of the 1050i signal includes as many pixels as twice the number of pixels in each line of the 525i signal.

Referring again to FIG. 1, the construction of the television set 1 is further described. A user operates the television set 1 using a remote commander 2. The television set 1 includes a system controller 12 for controlling operations over the entire system, and a signal receiver 11 for receiving a remote control signal. The system controller 12 includes a microcontroller including a CPU (Central Processing Unit), a RAM (Random Access Memory), and a ROM (Read Only Memory). The signal receiver 11 is connected to the system controller 12 such that when a remote control signal is output from the remote commander 2 in response to a control operation performed by a user, the signal receiver 11 receives the remote control signal and supplies a control signal corresponding to the received remote control signal to the system controller 12.

The remote commander 2 has buttons used to control the operation of the television set 1. They include, for example, channel selection buttons, and audio volume control buttons. The remote commander 2 also has a joystick 81 for inputting image adjustment commands which will be described later with reference to FIGS. 6 and 7, and has an automatic adjustment button 82 for automatically adjusting image quality by calculating suitable adjustment values depending on the feature of an image or the environmental conditions and on the basis of adjustment values employed in the past.

The system controller 12 is responsible for controlling the operation over the entire television set 1. For the above purpose, the system controller 12 generates control signals and supplies them to various parts of the television set 1 to control them. The system controller 12 is connected to a sensor 20 for detecting environmental parameters indicating, for example, temperature, humidity, brightness of a light, and the like in the ambient in which the television set 1 is located. The environmental parameters acquired via the sensor 20 are output from the system controller 12 to a feature value extractor 56. Herein, a plurality of sensors 20 may be used.

A receiving antenna 3 receives a broadcast signal (modulated RF signal). The broadcast signal captured by the receiving antenna 3 is supplied to a tuner 13. In accordance with a control signal supplied via the system controller 12, the tuner 13 selects a channel specified by a user using the remote commander 2. In the tuner 13, intermediate frequency amplification and detection are performed on the selected channel to obtain the SD signal (525i signal). A buffer memory 14 temporarily stores the SD signal output from the tuner 13.

In a case in which the television set 1 has the capability of receiving digital broadcast data including a program table in a format according to EPG (Electronic Program Guide), the system controller 12 extracts EPG data from received digital broadcast data (temporarily stored in the buffer memory 14) thereby acquiring the EPG data. The program data includes information about broadcast programs of few days, in terms of, for example, broadcast date and time, a channel, a title, actor/actress's names, a genre, and an abstract.

The television set 1 includes, or is connectable to, a recording/playing back apparatus for recording/reproducing content data onto/from recording medium such as an optical disk, a magnetic disk, a magnetooptical disk, a semiconductor memory, or a magnetic tape. In some cases, content data stored on a storage medium includes information, similar to EPG data, indicating a channel, a title, actor/actress's names, a genre, and/or an abstract.

The system controller 12 detects information indicating a genre or an abstract of content of a program being viewed or recorded from EPG data extracted from digital broadcast data or data, similar to EPG data, included in content data stored on a recording medium, and the system controller 12 supplies the detected information to the feature value extractor 56.

An image signal processing unit 15 is constructed such that the image signal processing unit 15 or a circuit board including the image signal processing unit 15 can be removed from the television set 1 and can be carried by a user. The image signal processing unit 15 performs image signal processing to convert a SD signal (525i signal) temporarily stored in the buffer memory 14 into a HD signal (1050i signal).

In the image signal processing unit 15, a first tap selector 41, a second tap selector 42 and a third tap selector 43 selectively extract data of a plurality of SD pixels in the vicinity of a location of interest in the HD signal (1050i signal) from the SD signal (525i signal) stored in the buffer memory 14, and the first to third tap selectors 41, 42 and 43 outputs the extracted data.

More specifically, the first tap selector 41 selectively extracts data of SD pixels to be used for prediction (hereinafter, such SD pixels will be referred to as "prediction taps"). The second tap selector 42 selectively extracts data of SD pixels to be used for classification in terms of the level distribution pattern of the SD pixel data (hereinafter referred to as (spatial class taps). The third tap selector 43 selectively extracts data of SD pixels to be used for classification in terms of motion (hereinafter, such SD pixels will be referred to as "motion class taps"). In a case in which a spatial class is determined on the basis of data of SD pixels in a plurality of fields, the spatial class also includes motion information.

A spatial class detector 44 detects the level distribution pattern of the spatial class tap data (SD pixel data) selectively extracted by the second tap selector 42. The spatial class detector 44 then determines a spatial class on the basis of the detected level distribution pattern and outputs class information indicating the spatial class.

The spatial class detector 44 compresses each SD pixel data, for example, from 8-bit data into 2-bit data and outputs, as spatial class information, the resultant compressed data corresponding to each SD pixel data. In the present embodiment, data compression is performed using an ADRC (Adaptive Dynamic Range Coding) technique. Note that the technique of data compression is not limited to the ADRC but other data compression techniques based on, for example, DPCM (predictive coding) or VQ (vector quantization) may also be employed.

The ADRC technique is a high-performance coding technique based on adaptive requantization, which has been originally developed for use in VTRs (Video Tape Recorders). The ADRC technique can represent a local pattern of a signal level in an efficient manner using short-length-word data, and thus the ADRC technique is suitable for use in the data compression. In the case in which the ADRC technique is used, if the maximum and minimum values of the spatial class tap data (SD pixel data) are denoted by MAX and MIN, respectively, the dynamic range of the spatial class tap data by DR (=MAX−MIN+1), and the number of bits of requantized data by P, then a requantized code qi can be determined in the form of compressed data for each SD pixel data ki of the spatial class tap data, in accordance with equation (1). In equation (1), [ ] denotes a rounding-down operation. In a case in which the number of SD pixel data included in spatial class tap data is equal to Na, i in equation (1) takes values of 1, 2, 3, . . . , Na.

$$qi=[(ki-\text{MIN}+0.5) \times 2^P/DR] \quad (1)$$

The motion class detector 45 detects a motion class, chiefly indicating the degree of motion, from the data of motion class taps (SD pixel data) selectively extracted by the third tap selector 43, and the motion class detector 45 outputs class information indicating the detected motion class.

More specifically, the motion class detector 45 calculates interframe differences from the motion class tap data (SD pixel data mi and SD pixel data ni (i=1, 2, 3, . . . )) selectively extracted from the third tap selector 43. Furthermore, the motion class detector 45 determines the motion class, which is a measure of motion, by thresholding the mean value of absolute values of differences. In this process, the motion class detector 45 calculates the mean value AV of absolute values of differences in accordance with equation (2). For example, in the case in which the third tap selector 43 extracts 12 SD pixel data m1 to m6 and n1 to n6 in the above-described manner, Nb in equation (2) is 6 (the maximum value of i).

$$AV = \frac{\sum_{i=1}^{Nb} |mi - ni|}{Nb} \quad (2)$$

The motion class detector 45 compares the mean value AV calculated in the above-described manner with one or more threshold values, thereby acquiring class information MV indicating the motion class. For example, in a case in which three threshold values th1, th2 and th3 (th1<th2<th3) are prepared, motion is classified into one of four motion classes depending on the mean value AV such that MV=0 when AV≦th1, MV=1 when th1<AV≦th2, MV=2 when th2<AV≦th3, or MV=3 when th3<AV.

On the basis of the requantized code qi output from the spatial class detector 44 as the class information indicating the spatial class and the class information MV of indicating the motion class output from the motion class detector 45 the class combiner 46 determines a class code CL indicating a class for pixel data (data of the pixel at the location of interest) of the HD signal (1050i signal) to be produced.

More specifically, the class combiner 46 calculates the class code CL in accordance with equation (3). In equation (3), Na denotes the number of data of spatial class taps (SD pixel data), and P denotes the number of bits of quantized data generated in the ADRC process.

$$CL = \sum_{i=1}^{Na} qi(2^P)^{i-1} + MV \cdot (2^P)^{Na} \quad (3)$$

A coefficient memory 53 stores a plurality of coefficient data Wi, for each class, used in the prediction equation used by a predictor 47. The coefficient data Wi are information necessary in conversion from a SD signal (525i signal) to a HD signal (1050i signal). The class code CL output from the class combiner 46 is supplied as read address information to the coefficient memory 53. In response, the coefficient memory 53 outputs coefficient data Wi (i=1 to n) which corresponds to the class code CL and which is to be used in the prediction equation. The output coefficient data Wi are supplied to the predictor 47.

The image signal processing unit 15 includes an information memory bank 51. The predictor 47 calculates the HD pixel data y to be generated, using data (SD pixel data) xi of prediction taps supplied from the first tap selector 41 and the coefficient data Wi read from the coefficient memory 53, in accordance with a prediction equation given by equation (4). In equation (4), n denotes the number of prediction taps selected by the first tap selector 41.

Herein, n pixel data selectively extracted as the prediction taps by the tap selector 41 are located in the spatial vicinity (in horizontal and vertical directions) and in the temporal vicinity of the location of interest in the HD signal.

$$y = \sum_{i=1}^{n} Wi \cdot xi \quad (4)$$

The coefficient data Wi (i=1 to n) in the prediction equation are generated in accordance with a generation equation, given by equation (5), including parameters S and Z. The information memory bank 51 stores coefficient seed data w10-wn9, for each class, which are used as the coefficient data in the generation equation. The manner of generating the coefficient seed data will be described later.

$$\begin{aligned}
W_1 &= w_{10} + w_{11}s + w_{12}z + w_{13}s^2 + w_{14}sz + w_{15}z^2 + \\
&\quad w_{16}s^3 + w_{17}s^2z + w_{18}sz^2 + w_{19}z^3 \\
W_2 &= w_{20} + w_{21}s + w_{22}z + w_{23}s^2 + w_{24}sz + w_{25}z^2 + \\
&\quad w_{26}s^3 + w_{27}s^2z + w_{28}sz^2 + w_{29}z^3 \\
&\vdots \\
W_i &= w_{i0} + w_{i1}s + w_{i2}z + w_{i3}s^2 + w_{i4}sz + w_{i5}z^2 + \\
&\quad w_{i6}s^3 + w_{i7}s^2z + w_{i8}sz^2 + w_{i9}z^3 \\
&\vdots \\
W_n &= w_{n0} + w_{n1}s + w_{n2}z + w_{n3}s^2 + w_{n4}sz + w_{n5}z^2 + \\
&\quad w_{n6}s^3 + w_{n7}s^2z + w_{n8}sz^2 + w_{n9}z^3
\end{aligned} \quad (5)$$

As described above, in the conversion from a 525i signal into a 1050i signal, it is required to obtain four pixels in the 1050i signal corresponding to each pixel in the 525i signal in each odd field and also in each even field, wherein 4 (=2×2) blocks in each unit pixel block of the 1050i signal in each odd field and those in each even field are different in phase with respect to the central prediction tap from each other.

Figure 3:
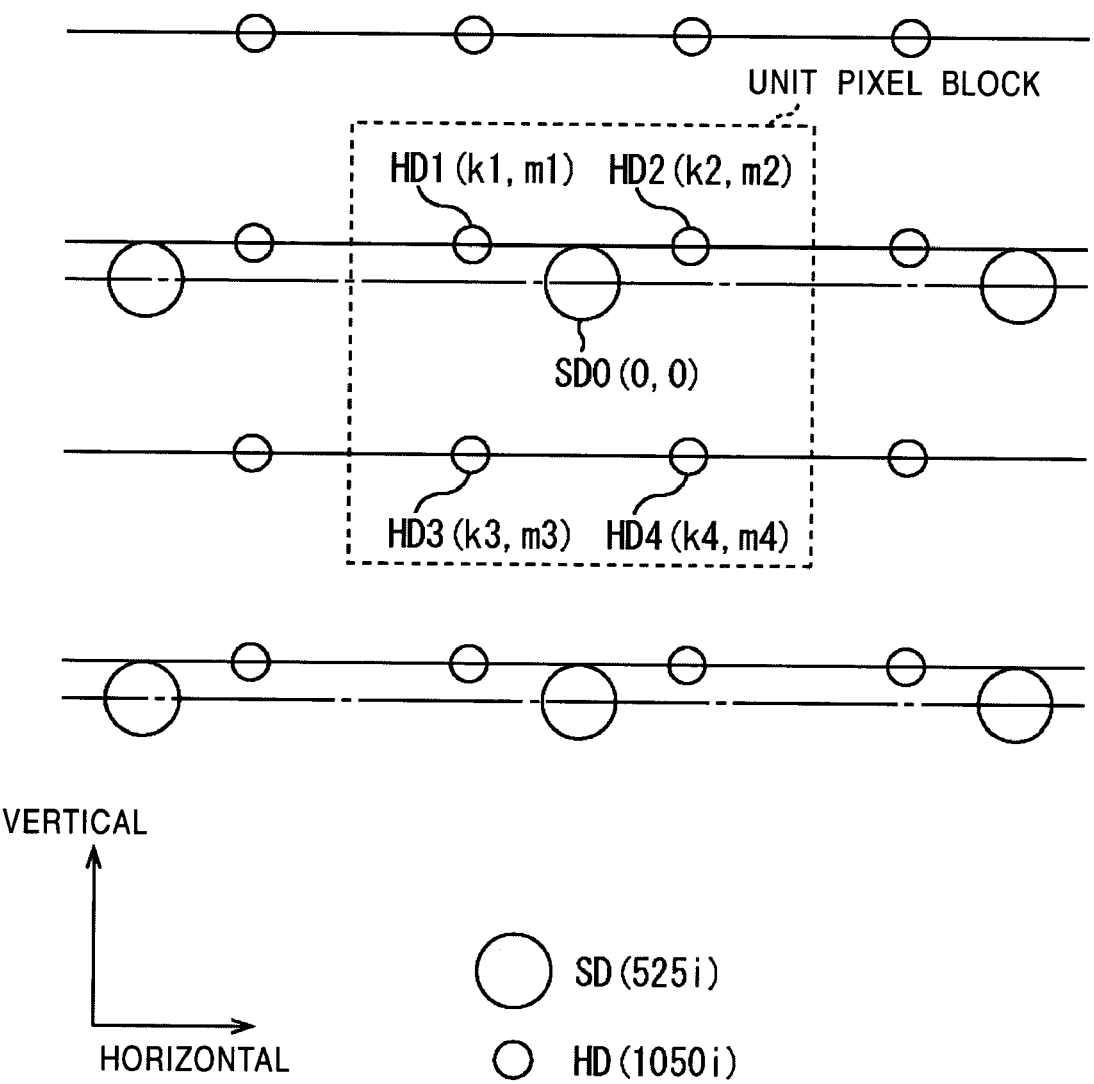
FIG. 3 is a diagram showing phase differences, relative to a central prediction tap, of four pixels in a unit pixel block of a HD signal (1050i signal) in an odd field.

FIG. 3 shows phase differences, relative to the central prediction tap SD0, of four pixels HD1 to HD4 in a unit pixel block of a 1050i signal in an odd field. In this example, the locations of pixels HD1 to HD4 deviate by k1 to k4, respectively, from the location of the central prediction tap SD0 in a horizontal direction, and by m1 to m4, respectively, in a vertical direction.

Figure 4:
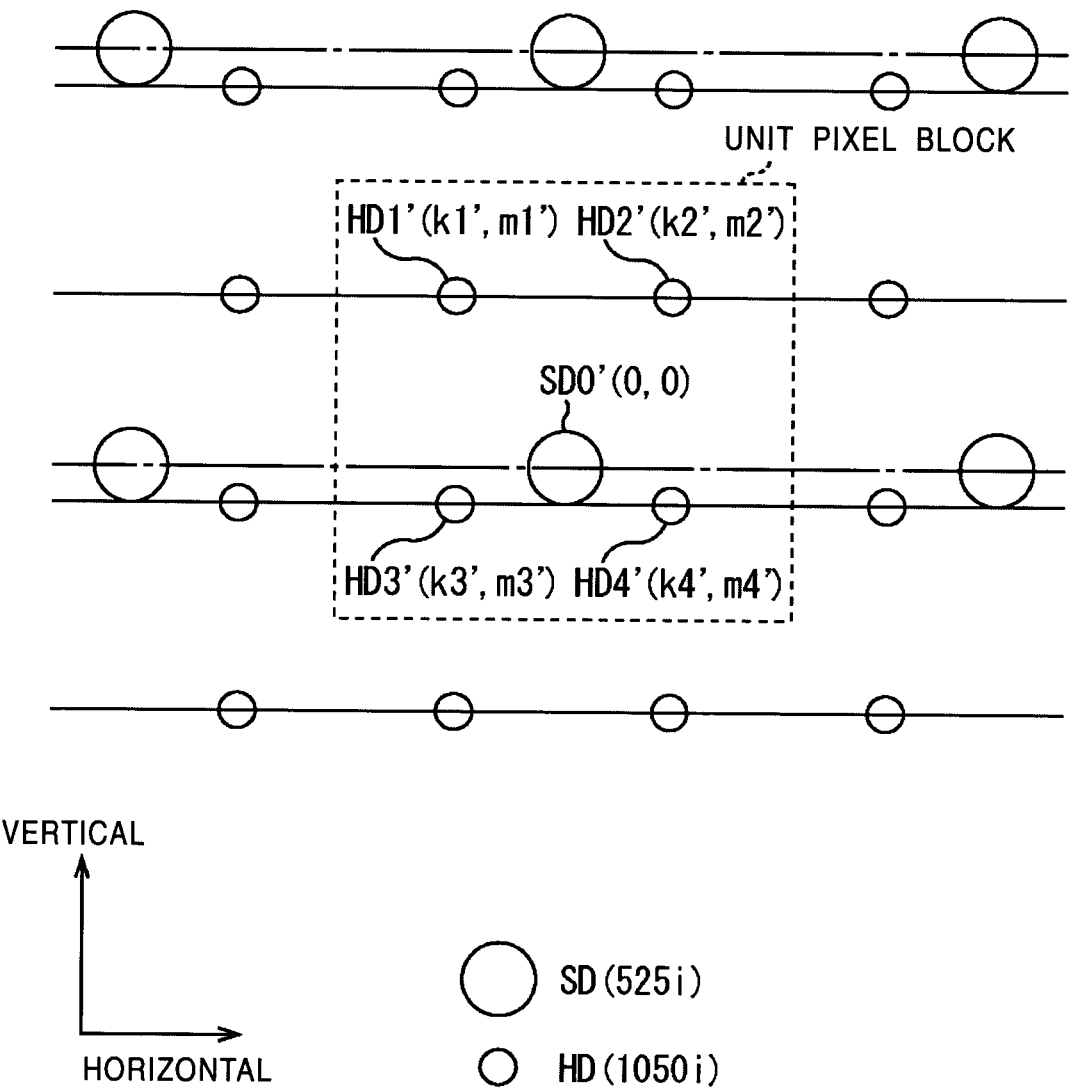
FIG. 4 is a diagram showing phase differences, relative to a central prediction tap, of four pixels in a unit pixel block of a HD signal (1050i signal) in an even field.

FIG. 4 shows phase differences, relative to the central prediction tap SD0', of four pixels HD1' to HD4' in a 2×2 unit pixel block of a 1050i signal in an even field. In this example, the locations of pixels HD1' to HD4' deviate by k1' to k4', respectively, from the location of the central prediction tap SD0' in the horizontal direction, and by m1' to m4', respectively, in the vertical direction.

Thus, in the information memory bank 51, coefficient seed data w10-wn9 are stored for each combination of a class and output pixels (HD1 to HD4 or HD1' to HD4').

For each class, a coefficient generator 52 generates coefficient data Wi (i=1 to n) which correspond to the values of parameters S and Z and which are used in the prediction equation, using the coefficient seed data of each class loaded from the information memory bank 51 and the values of parameters S and Z supplied from the system controller 12 or a history information memory 50, in accordance with equation (5).

That is, the coefficient generator 52 receives not only the values of parameters S and Z from the system controller 12, but also receive, instead of the parameters S and Z, volume values Sv and Zv corresponding to the feature value extracted by the feature value extractor 56 from the history information memory 50. In this case, the coefficient generator 52 substitutes the volume values Sv and Zv, instead of the parameters S and Z, into equation (5) to generate the coefficient data Wi (i=1 to n).

The coefficient data Wi (i=1 to n) of each class generated by the coefficient generator 52 are stored in the coefficient memory 53 described above. The generation of the coefficient data Wi (i=1 to n) of each class by the coefficient generator 52 is performed, for example, in each vertical blanking period. Thus, when the values of parameters S and Z are changed in response to a control operation performed by a user on the remote commander 2, the coefficient data Wi of each class stored in the coefficient memory 53 are immediately changed to values corresponding to the new values of the parameters S and Z, thereby allowing the user to smoothly adjust the resolution.

A normalization coefficient calculator 54 calculates, in accordance with equation (6), the normalization coefficients Sn corresponding to the coefficient data Wi (i=1 to n) determined by the coefficient generator 52.

$$S_n = \sum_{i=1}^{n} W_i \quad (6)$$

The resultant calculated normalization coefficients Sn are stored in a normalization coefficient memory 55. The class code CL output from the class combiner 46 described above is supplied as read address information to the normalization coefficient memory 55. In response, the normalization coefficient memory 55 reads normalized coefficient Sn corresponding to the class code CL and supplies them to the normalizer 48.

The predictor 47 calculates the pixel data (at the location of interest) of the HD signal to be produced, using data (SD pixel data) xi of the prediction taps selectively extracted by the first tap selector 41 and the coefficient data Wi read from the coefficient memory 53, in accordance with the prediction equation given by equation (4).

As described above, to convert a SD signal (525i signal) into a HD signal (1050i signal), it is required to obtain four pixels (for example, pixels HD1 to HD4 shown in FIG. 3 or HD1' to HD4' shown in FIG. 4) of the HD signal corresponding to each pixel of the SD signal. Thus, the predictor 47 generates pixels data of the HD signal on a block-by-block basis wherein each block includes 2×2 pixels. More specifically, prediction tap data xi corresponding to the four pixels (of interest) in a unit pixel block are supplied from the first tap selector 41 to the predictor 47, and coefficient data Wi corresponding to the four pixels in that unit pixel block are supplied from the coefficient memory 53 to the predictor 47, and the predictor 47 calculates, separately, each of data y1 to y4 of the four pixels in the unit pixel block in accordance with the above-described prediction equation given by equation (4).

The normalizer 48 normalizes the data y1 to y4 of the four pixels sequentially output from the predictor 47 by dividing them by the normalization coefficients Sn which are read from the normalization coefficient memory 55 and which correspond to the coefficient data Wi (i=1 to n) used in the calculations. As described above, the coefficient generator 52 determines coefficient data Wi used in the prediction equation. However, the determined coefficient data can includes rounding errors, and thus it is not guaranteed that the sum of the coefficient data Wi (i=1 to n) is equal to 1.0, and the data y1 to y4 of the respective pixels calculated by the predictor 47 have fluctuations in level due to the rounding errors. To avoid the above problem, the normalizer 48 normalizes the data y1 to y4 thereby removing the fluctuations in level due to the rounding errors.

The data y1' to y4' of four pixels in each unit pixel block produced by the normalizer 48 by normalizing the data y1 to y4 are sequentially supplied to a post processing unit 49. The post processing unit 49 rearranges the received data into a line-sequential fashion and outputs the resultant data in the 1050i format.

The feature value extractor 56 extracts image feature values such as a variance or mean value of image levels from the SD signal (525i signal) stored in the buffer memory 14 and supplies the extracted image feature values to the history information memory 50 together with environmental information indicating temperature, humidity, and/or brightness of a light in an ambient, detected by the sensor 20 and supplied to the feature value extractor 56 via the system controller 12 and also together with information such as a title, actor/actress's names, and a category of the content from the information supplied from the system controller 12.

The values of parameters S and Z input from the system controller 12 to the coefficient generator 52 are also input to the history information memory 50. In response, the history information memory 50 calculates the volume values Sv and Zv corresponding to the feature data supplied from the feature value extractor 56. The calculated volume values Sv and Zv are output to the coefficient generator 54.

Figure 5:
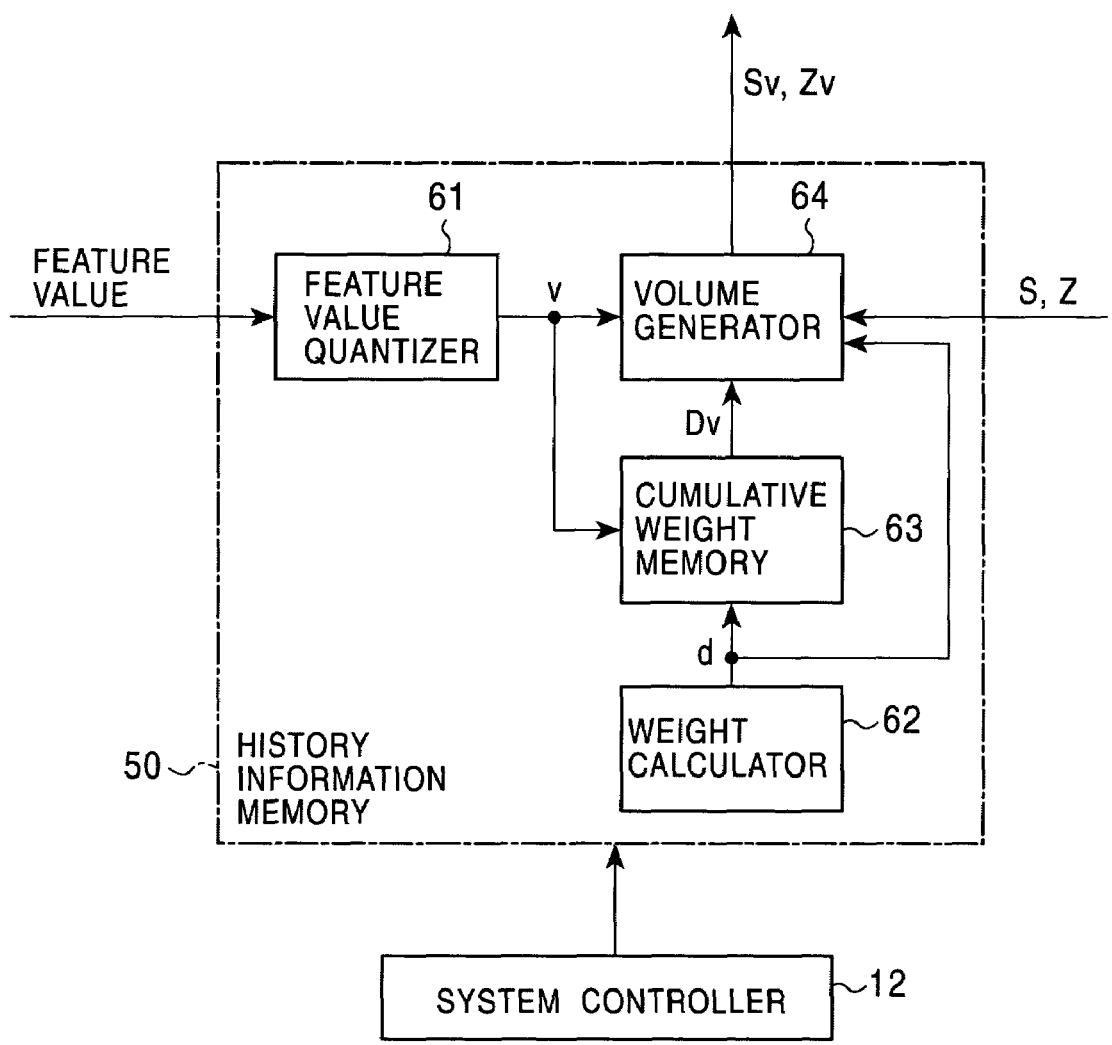
FIG. 5 is a block diagram showing the construction of a history information memory.

FIG. 5 is a block diagram showing the details of the history information memory 50. The history information memory 50 includes a feature value quantizer 61, a weight calculator 62, a cumulative weight memory 63, and a volume value generator 64.

The feature value quantizer 61 receives, from the feature value extractor 56, image feature values such as the variance or mean value of image levels, environmental information indicating temperature, humidity, and/or brightness of the light in the ambient, and/or information such as the title, actor/actress's names, and the category of the content. In a case in which information in the form of a numeral is input to the feature value quantizer 61, the feature value quantizer 61 quantizes the input information with predetermined quantization steps. However, in a case in which the input information is not in the form of a numeral, the feature value quantizer 61 quantizes the input information by classifying it into one of predetermined groups. The quantized feature value v is output to the cumulative weight memory 63 and the volume value generator 64.

The feature value quantizer 61 may receive a value of one feature and quantize the received value of the feature, or may receive values of a plurality of features and quantize the received values of the plurality of features.

If the user operates the remote commander 2 to adjust the image quality, and if signals indicating the changed parameters S and Z are input to the weight calculator 62 via the system controller 12, the weight calculator 62 calculates the weight d in accordance with the volume control operation performed on the remote commander 2 by the user until the volume control operation is ended. The value of the weight d is repeatedly calculated until the volume control operation by the user is ended. If the volume control operation by the user is completed, the weight calculator 62 outputs the value of the weight d to the cumulative weight memory 63 and the volume value generator 64.

A specific example of the manner of calculating the weight d is to assume that a user spends a longer time to perform the volume control operation increases when the user wants to make a finer adjustment, and to assign, to the weight d, a value proportional to the time spent by the user to perform the volume control operation. Another example of the manner of calculating the weight d is to assume that volume values can be regarded as having been precisely set when the volume values have converged quickly in the volume control operation but volume values can be regarded as not being set well when volume values have converged slowly, and thus to assign the weight d a value given as a function of the mean value of the square of the absolute value of the volume adjustment range and the square of the median. Another example of the manner of calculating the weight d is to assume that the user does not like the image quality at a time immediately before the user starts the volume control operation and to assign, to the weight d, a small value when an adjusted value is close to a value of a parameter at that time immediately before the user starts the volume control operation.

The cumulative weight memory 63 stores cumulative weights Dv for respective input feature values v, and extracts a cumulative weight Dv corresponding to a quantized feature value v input from the feature value extractor 56 and outputs the extracted cumulative weight Dv to the volume value generator 64. After outputting the cumulative weight Dv to the volume value generator 64, the cumulative weight memory 63 calculates a new cumulative weight Dv using the weight d input from the weight calculator 62 in accordance with an equation Dv=Dv+d and replaces the current value of the cumulative weight Dv with the calculated cumulative weight Dv.

In the volume value generator 64, the volume values S'v and Z'v output in the past are stored. If the volume value generator 64 receives the parameters S and Z indicating the final adjusted values from the controller 12, the quantized feature value v from the feature value extractor 56, the weight d from the weight calculator 62, and the cumulative weight Dv from the cumulative weight memory 63, the volume value generator 64 calculates the output volume values Sv and Zv corresponding to the feature value v using the above received values in accordance with equations (7) and (8). The calculated volume values Sv and Zv are stored in the volume value generator 64. Under the control of the system controller 12, the volume value generator 64 supplies the output volume values Sv and Zv to the coefficient generator 52.

$$Sv=((S'v \times Dv)+S)/(Dv+d) \qquad (7)$$

$$Zv=((Z'v \times Dv)+Z)/(Dv+d) \qquad (8)$$

If readjustment of the parameters S and Z is started, the volume value generator 64 stores the output volume values Sv and Zv calculated in accordance with equations (7) and (8) as the past output volume values S'v and Z'v, and the volume value generator 64 calculates new output volume values Sv and Zv.

The cumulative weight memory 63 and the volume value generator 64 are formed of, for example, nonvolatile memory so that the contents stored therein can be retained even when the power of the television set 1 is in the off state.

Thus, as described above, on the basis of features of the image, environmental parameters, and the adjustment values used in the past, the history information memory 50 calculates volume values which are likely to correspond to image quality desired by the user, and the history information memory 50 outputs the calculated volume values to the coefficient generator 52 for use in generation of coefficients which determine the image quality in response to the volume control operation by the user.

Referring again to FIG. 1, the construction of the television set 1 is further described below.

An OSD (On Screen Display) processing unit 16 generates a display signal for displaying characters or graphical images on the screen of a display 18. A mixer 17 combines the display signal output from the OSD processing unit 16 with the HD signal output from the image signal processing unit 15 and supplies the resultant signal to the display 18. As for the display 18, for example, a CRT (cathode-ray tube) display or a LCD (liquid crystal display) may be used. The display 18 displays an image corresponding to the HD signal output from the image signal processing unit 15 and also displays, as required, an image corresponding to the display signal mixed by the mixer 17.

As required, a drive 19 is connected to the system controller 12 and a magnetic disk 21, an optical disk 22, a magnetooptical disk 23, or a semiconductor memory 24 is mounted on the driver 19 to install a computer program into the system controller 12.

The operation of the television set 1 is described below.

In response to a command input by a user via the remote commander 2, the system controller 12 controls the tuner 13. Under the control of the system controller 12, the tuner 13 performs channel selection, intermediate frequency amplification, and detection on a broadcast signal received via the antenna 3. The resultant SD signal (525i signal) is output to the buffer memory 14.

The SD signal (525i signal) supplied from the tuner 13 to the buffer memory 14 is temporarily stored in the buffer memory 14. The SD signal temporarily stored in the buffer memory 14 is then supplied to the image signal processing unit 15 and converted to a HD signal (1050i signal) in accordance with a control signal supplied from the system controller 12.

That is, the image signal processing unit 15 acquires pixel data of a HD signal (hereinafter, referred to as "HD pixel data") from pixel data of the SD signal (hereinafter, referred to as "SD pixel data"). The HD signal output from the image signal processing unit 15 is combined, as required, by the mixer 17 with a display signal indicating characters or a graphical image output from the OSD processing unit 16. The resultant signal is supplied to the display 18, and an image is displayed on the screen of the display 18.

The user can adjust the spatial and temporal resolutions of the image displayed on the screen of the display 18 by operating the remote commander 2. The image signal processing unit 15 calculates HD pixel data in accordance with the prediction equation. In this calculation, coefficients in the prediction equation are determined on the basis of the parameters S and Z indicating the spatial and temporal resolutions specified by the user via the remote commander 2, or determined on the basis of, instead of the parameters S and Z, the volume values Sv and Zv calculated by the history information memory 50, and the HD pixel data are calculated in accordance with the generation equation including the parameters S and Z. As a result, the image of the HD signal output from the image signal processing unit 15 has the spatial resolution and temporal resolution corresponding to the specified parameters S and Z or calculated volume values Sv and Zv, respectively.

Figure 6:
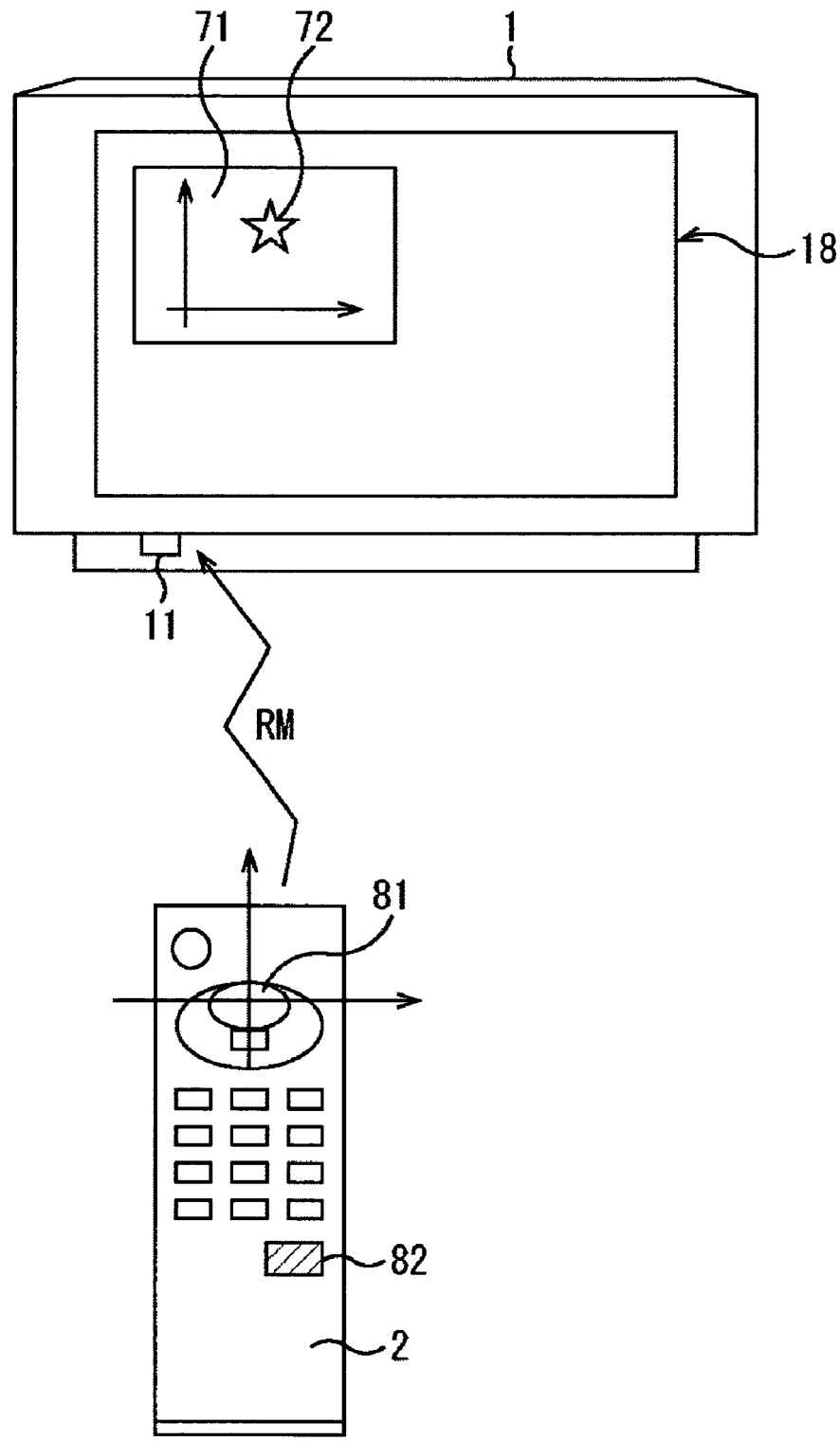
FIG. 6 is a diagram showing an example of a user interface for adjusting image quality.

FIG. 6 shows an example of a user interface for adjusting the parameters S and Z. During the adjustment, an adjustment screen 71 is displayed in the OSD manner on the display 18. On the adjustment screen 71, as shown in FIG. 6, a star-shaped icon 72 is displayed to indicate the adjusted values of the parameters S and Z. The remote commander 2 includes a joystick 81 operated by the user and an automatic adjustment button 82.

The user can move the location of the icon 72 on the adjustment screen 71 by operating the joystick 81 to specify the values of the parameters S and Z which determine the spatial and temporal resolution, respectively, such that the HD image has desired image quality. If the user presses the automatic adjustment button 82, the coefficients in the prediction equation is calculated using the volume values Sv and Zv calculated by the history information memory 50, and the image quality of the HD pixel data is automatically adjusted in accordance with the preference of the user, the features of the image, and the environmental parameters so that the image displayed has desirable image quality.

Figure 7:
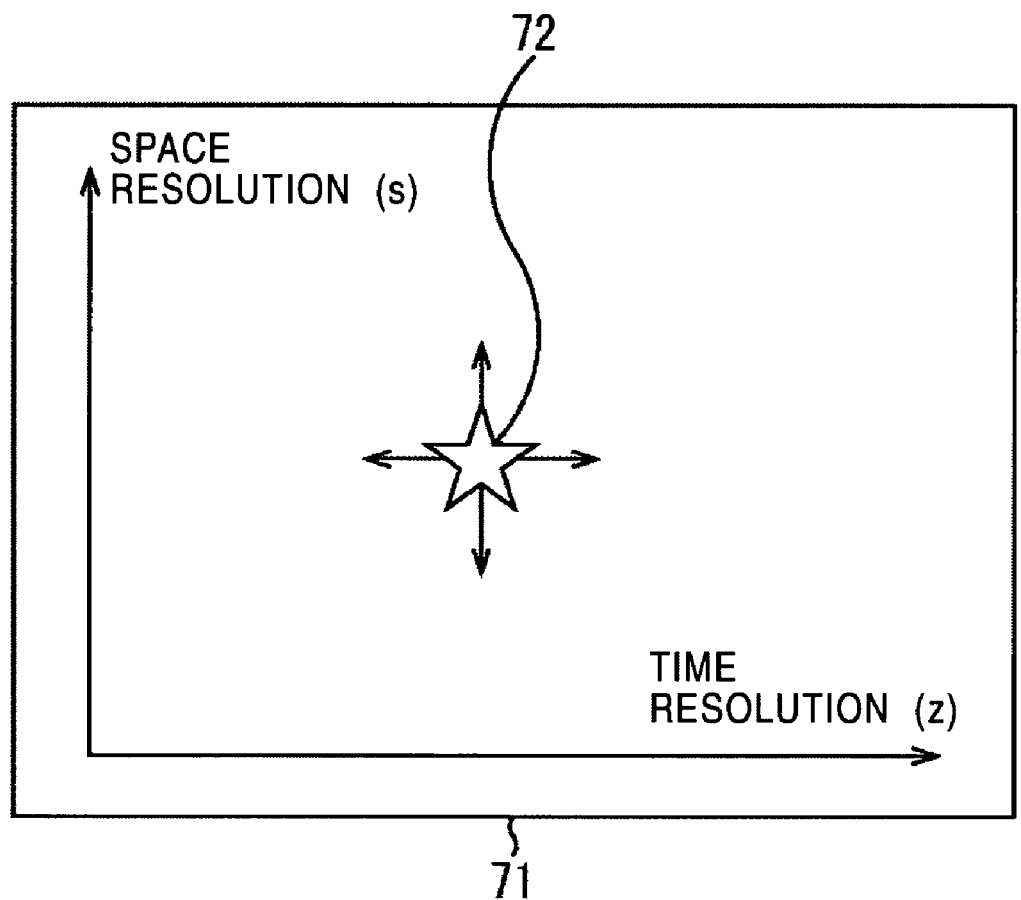
FIG. 7 is a diagram showing, in an enlarged fashion, a part of an adjustment screen shown in FIG. 6.

FIG. 7 shows, in an enlarged fashion, a part of the adjustment screen 71 shown in FIG. 6. If the icon 72 is moved to right or left, the parameter Z associated with the temporal resolution is adjusted (in accordance with a new value on the horizontal coordinate axis shown in FIG. 7). On the other hand, if the icon 72 is moved upward or downward, the parameter S associated with the spatial resolution is adjusted (in accordance with a new value on the vertical coordinate value shown in FIG. 7). Thus, the user can easily adjust the parameters S and Z by moving the icon 72 on the adjustment screen 71 displayed on the display 18.

The remote commander 2 may include, instead of the joystick 81, a mouse, a trackball, or another type of pointing device. Numerals indicating the values of the parameters S and Z adjusted by the user may be displayed on the adjustment screen 71.

The operation of the image signal processing unit 15 is described below.

If the second tap selector 42 receives the SD signal (525i signal) stored in the buffer memory 14, the second tap selector 42 selectively extracts spatial class tap data (SD pixel data) at locations in the vicinity of four pixels (at locations of interest) in a unit pixel block of a HD signal (1050i signal) to be produced. The spatial class tap data (SD pixel data) selectively extracted by the second tap selector 42 is supplied to the spatial class detector 44. The spatial class detector 44 performs the ADRC processing on the respective SD pixel data given as the spatial class tap data thereby obtaining a requantized code qi serving as class information indicating a spatial class (a class indicating a spatial waveform) (refer to equation (1)).

On the other hand, if the third tap selector 43 receives the SD signal (525i signal) stored in the buffer memory 14, the third tap selector 43 selectively extracts motion class tap data (SD pixel data) at locations in the vicinity of four pixels (at locations of interest) in the unit pixel block of the HD signal (1050i signal) to be produced. The motion class tap data (SD pixel data) selectively extracted by the third tap selector 43 is supplied to the motion class detector 45. The motion class detector 45 obtains class information MV indicating a motion class (a class indicating the degree of motion) from the respective SD pixel data given as the motion class tap data.

The motion information MV and the requantized code qi are supplied to the class combiner 46. The class combiner 46 obtains a class code CL indicating a class of four pixels (of interest) in each unit pixel block of the HD signal (1050i signal) to be produced, from the supplied motion information MV and the requantized code qi (refer to FIG. (3)). The resultant class code CL is supplied as read address information to the coefficient memory 53 and the normalization coefficient memory 55.

The values of parameters S and Z specified by the user or the volume values Sv and Zv calculated by the history information memory 50 are input to the coefficient generator 52.

Figure 8:
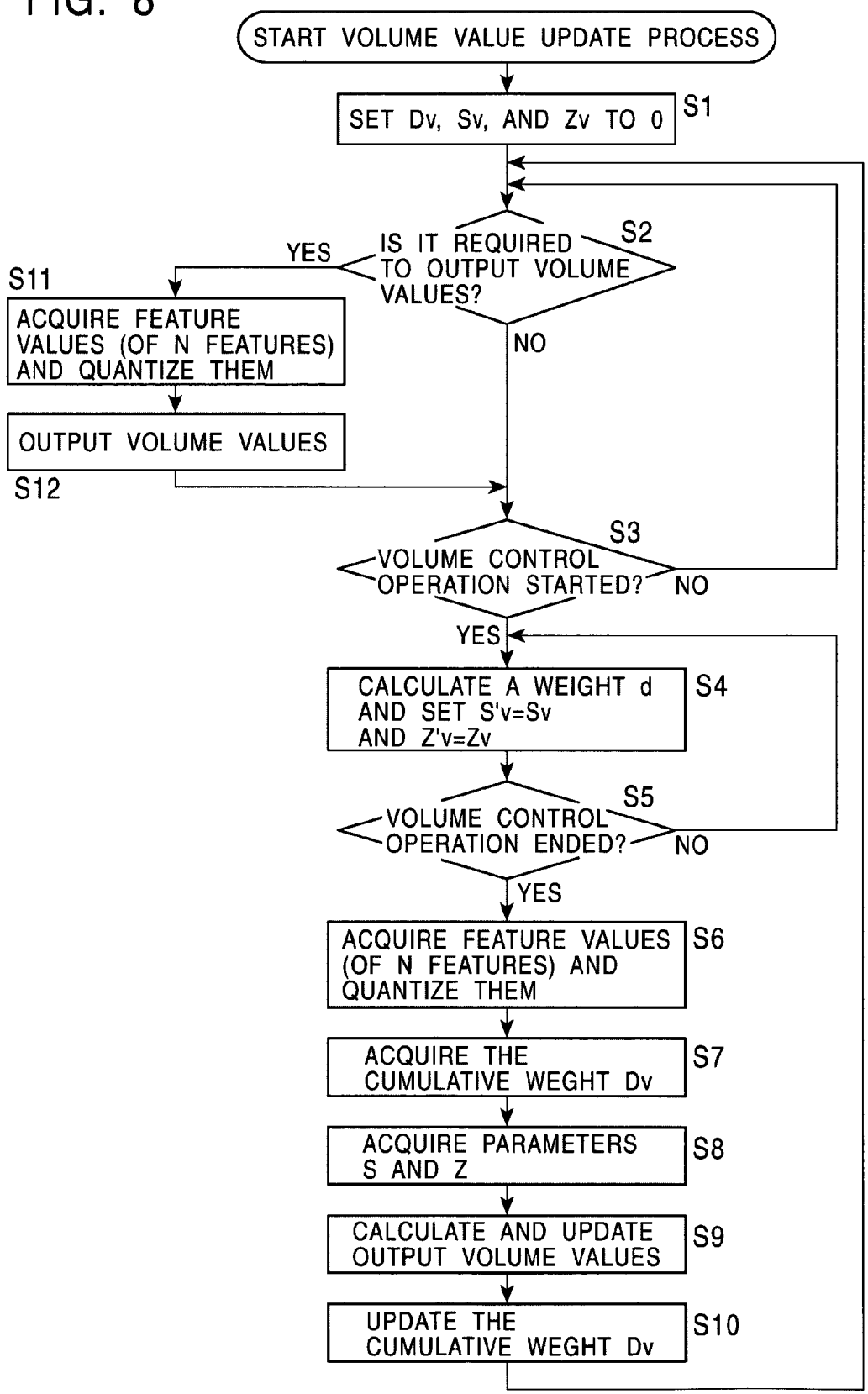
FIG. 8 is a flow chart showing a process changing volume values.

A process of updating the volume values is described below with reference to a flow chart shown in FIG. 8.

In step S1, the cumulative weight memory 63 initializes the value of the cumulative weight Dv corresponding to a feature value v indicating the cumulative weight, and the volume value generator 64 initializes volume values Sv and Zv. The optimum number of quantization steps of feature values depends on the types of feature values and the classification method. In the present embodiment, it is assumed that the feature value quantizer 61 quantizes each feature value into one of V steps.

In step S2, the volume value generator 64 determines whether or not to output volume values Sv and Zv on the basis of a control signal supplied from the system controller 12. The volume values Sv and Zv are output from the volume value generator 64, for example, when a user issues a command, via the remote commander 2, to make an automatic adjustment using volume values corresponding to feature values or when the cumulative weight has become greater than a predetermined value. When volume values Sv and Zv are not output from the volume value generator 64, the coefficient generator 52 generates coefficients using adjustment values S and Z supplied from the system controller 12. In the case in which volume values Sv and Zv are output from the volume value generator 64, the coefficient generator 52 generates coefficients using volume values Sv and Zv output from the volume value generator 64.

If, in step S2, it is determined not to output volume values, the process proceeds to step S3. In step S3, the system controller 12 determines, on the basis of a signal supplied from the signal receiver 11, whether a user has started a volume control operation. If it is determined in step S3 that the volume control operation has not been started, the process returns to step S2 to repeat step S2 and following steps.

However, it is determined in step S3 that the volume control operation has been started, the process proceeds to step S4. In step S4, the system controller 12 outputs, to the history information memory 50, a control signal indicating that the volume control operation has been started. The weight calculator 62 determines the weight d, for example, by assigning, to the weight d, a value proportional to the time spent by the user to perform the volume control operation or by assigning, to the weight d, a value determined as a function of the mean value of the square of the absolute value of the volume adjustment range and the square of the median. The determined weight d is output to the cumulative weight memory 63. The volume value generator 64 stores the current volume values Sv and Zv as S'v=Sv and Z'v=Zv. That is, the volume value generator 64 stores past volume values corresponding to feature values v. The time spent by the user to perform the volume control operation is output from a timer disposed in the remote commander and supplied to the weight calculator 62 via the system controller 12. The timer for measuring the time spent by the user to perform the volume control operation may be disposed in the system controller.

In step S5, the system controller 12 determines, on the basis of a signal received from the signal receiver 11, whether the volume control operation has been ended. If it is determined in step S5 that the volume control operation is not ended, the processing returns to step S4 to perform step S4 and the following steps.

If it is determined in step S5 that the volume control operation has been ended, the process proceeds to step S6. In step S6, the system controller 12 outputs, to the history information memory 50, a control signal indicating that the volume control operation has been ended. When the feature value quantizer 61 receives, from the feature value extractor 56, image feature values indicating, for example, the variance of image level, the mean value of image levels (associated with brightness, chroma, and the like), environmental information indicating temperature, humidity, brightness of a light in the ambient, or information associated with the content such as a title, actor/actress's names, and a category, the feature value quantizer 61 quantizes the received information with V steps and supplies the resultant quantized feature value v to the cumulative weight memory 63 and the volume value generator 64.

In step S7, on the basis of a quantized feature value v supplied from the feature value extractor 56, the volume value generator 64 acquires a value indicating the cumulative weight Dv corresponding to the feature value v from the cumulative weight memory 63.

In step S8, the volume value generator 64 acquires values of parameters S and Z finally adjusted by a user. In step S9, on the basis of the parameter S and Z, the quantized feature value v supplied from the feature value extractor 56, the weight d supplied from the weight calculator 62, and the cumulative weight Dv supplied from the cumulative weight memory 63, the volume value generator 64 calculates output volume values Sv and Zv corresponding to the feature value v using equations (7) and (8) described above.

In step S10, the cumulative weight memory 63 calculates a new cumulative weight Dv using the weight d input from the weight calculator 62 in accordance with an equation Dv=Dv+d and replaces the current value of the cumulative weight Dv with the calculated cumulative weight Dv. After completion of step S10, the process returns to step S2 to repeat step S2 and following steps.

If it is determined in step S2 that the volume values should be output, the process proceeds to step S11. In step S11, the feature value quantizer 61 receives, from the feature value extractor 56, image feature values such as the variance or mean value of image levels, environmental information indicating temperature, humidity, brightness of a light in the ambient, and/or information such as the title, actor/actress's names, and the category of the content, and the feature value quantizer 61 quantizes the received information with V steps. The feature value quantizer 61 supplies the resultant quantized feature value v to the volume value generator 64.

In step S12, the volume value generator 64 extracts volume values Sv and Zv corresponding to the received feature value v from the volume values stored for respective feature values, and the volume value generator 64 outputs the extracted volume values Sv and Zv to the coefficient generator 52. After the completion of step S12, the processing proceeds to S3 to perform step S3 and following steps.

As described above with reference to FIG. 8, the history information memory 50 calculates the volume values corresponding to the input image feature value in accordance with the weights and stores the calculated volume values. As required, the history information memory 50 outputs the volume values corresponding to the feature value to the coefficient generator 52.

By producing volume values Sv and Zv in accordance with the image feature, the environmental parameters, and/or the information associated with the content data, it becomes possible to process the content data using the volume values Sv and Zv corresponding to the image feature, the environmental parameters, and/or the information associated with the content data.

During each vertical blanking period, the coefficient generator 52 determines coefficient data Wi (i=1 to n) of the prediction equation using coefficient seed data w10 to wn9 for each combination of a class and output pixels (HD1 to HD4 or HD1' to HD4') corresponding to values of parameters S and Z adjusted by the user or volume values Sv and Zv received from the history information memory 50, and the coefficient generator 52 outputs the resultant coefficient data Wi to the coefficient memory 53 to store them therein (refer to equation (5)). Furthermore, the normalization coefficient calculator 54 produces normalization coefficients Sn corresponding to the coefficient data Wi (i=1 to n) of the prediction equation determined by the coefficient generator 52, and the resultant normalization coefficients Sn are stored in the normalization coefficient memory 55 (refer to equation (6)).

When the class code CL is supplied as read address information to the coefficient memory 53, the coefficient memory 53 outputs coefficient data Wi used in the prediction equation for four output pixels (HD1 to HD4 in an odd field or HD1' to HD4' in an even field) corresponding to the class code CL. The output coefficient data Wi are supplied to the predictor 47. When the first tap selector 41 receives the SD signal (525i signal) stored in the buffer memory 14, the first tap selector 41 selectively extracts prediction tap data (SD pixel data) at locations in the vicinity of four pixels (at locations of interest) in a unit pixel block of a HD signal (1050i signal) to be produced.

On the basis of the prediction tap data (SD pixel data) xi and the coefficient data Wi read from the coefficient memory 53 for four output pixels, the predictor 47 calculates the data y1 to y4 of the four pixels (at locations of interest) in the unit pixel block of the HD signal to be produced (refer to equation (4)). The calculated data y1 to y4 of the four pixels in the unit pixel block of the HD signal are sequentially output from the predictor 47 to the normalizer 48.

As described above, when the class code CL is supplied as read address information to the normalization coefficient memory 55, the normalization coefficient memory 55 outputs normalization coefficients Sn corresponding to the class code CL. That is, the normalization coefficients Sn, corresponding to the coefficient data Wi used in the calculation of the HD pixel data y1 to y4 output from the predictor 47, are read from the normalization coefficient memory 55 and supplied to the normalizer 48. The normalizer 48 normalizes the HD pixel data y1 to y4 output from the predictor 47 by dividing them by the corresponding normalization coefficients Sn thereby removing the fluctuations in levels of the data y1 to y4 due to the rounding errors in the calculation of the coefficient data Wi performed by the coefficient generator 52. Thus, data y1' to y4' are obtained.

The resultant normalized data y1' to y4' produced in the above-described manner for the four pixels in the unit pixel block are sequentially output from the normalizer 48 and supplied to the post processing unit 49. If the post processing unit 49 receives the data y1' to y4' of the four pixels in each unit pixel block sequentially supplied from the normalizer 48, the post processing unit 49 rearranges the received data into a line-sequential fashion and outputs the resultant data in the 1050i format. Thus, the HD signal in the 1050i format is output from the post processing unit 49.

As described above, the image signal processing unit 15 calculates the HD pixel data y using the adjusted values of the parameters S and Z or coefficient data Wi (i=1 to n) of the prediction equation corresponding to the volume values Sv and Zv calculated by the history information memory 50. Thus, as described above, the user can adjust the spatial and temporal resolutions of the image of the HD signal by adjusting the values of the parameters S and Z. The user can also make an automatic adjustment of the image quality by using the volume values Sv and Zv stored in the history information memory 50 for each feature value.

The coefficient data of each class corresponding to the adjusted values of parameters S and Z or the volume values Sv and Zv supplied from the history information memory 50 are generated by the coefficient generator 52 whenever they are required, and thus a memory for storing a large amount of coefficient data is not necessary. This allows a reduction in the memory capacity.

Furthermore, as described above, the user can adjust the values of the parameters S and Z on the adjustment screen 71. Volume values Sv and Zv corresponding to feature values v are calculated using the values of the respective parameters S and Z supplied to the coefficient generator 52 from the system controller 12 and are stored in the volume value generator 64 (FIG. 5) of the history information memory 50.

Furthermore, as described in further detail below, the history information memory 50 may calculate adjustment values associated with the image quality most preferred by the user on the basis of the volume values Sv and Zv stored in the volume value generator 64, and the history information memory 50 may output the calculated adjustment values to the coefficient generator 52 thereby making it possible to automatically adjust the image quality.

Figure 9:
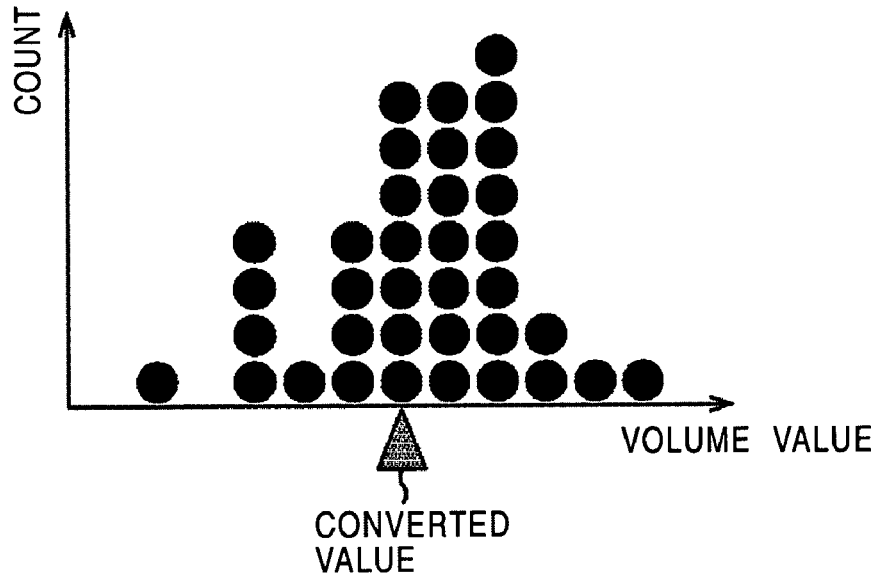
FIG. 9 is a diagram showing a simple mean value of stored volume values.

That is, as shown in FIG. 9, the weight calculator 62 determines the mean values of the volume values Sv and Zv from the distribution thereof stored in the volume value generator 64. The weight calculator 62 assumes that the calculated mean values indicate the adjustment values most preferred by the user, and the weight calculator 62 outputs the calculated mean values to the volume value generator 64. The volume value generator 64 transfers the received mean values of the volume values to the coefficient generator 52 to adjust the image quality on the basis of the mean values.

Figure 10:
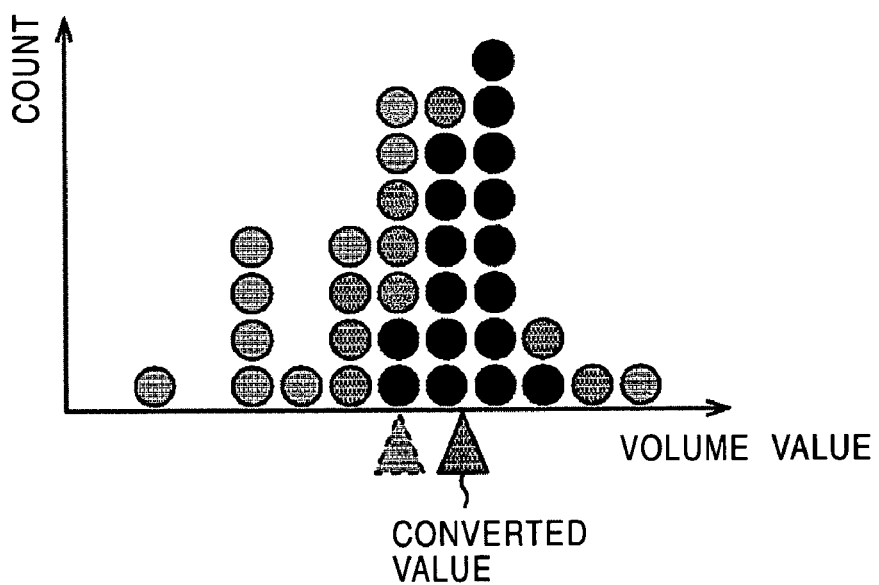
FIG. 10 is a diagram showing a weighted mean value of stored volume values.

Alternatively, instead of the simple mean value described above, a weighted mean value may be employed. More specifically, as shown in FIG. 10, the weight calculator 62 may weight the volume values Sv and Zv stored in the volume value generator 64 such that medians thereof are most greatly weighted and may calculate the weighted mean value. The weight calculator 62 assumes that the resultant weighted mean values indicate the adjustment values most preferred by the user, and the weight calculator 62 outputs the weighted mean values to the volume value generator 64. The volume value generator 64 transfers the received weighted mean values to the coefficient generator 52 to adjust the image quality on the basis of the mean values.

If the weighted mean values are used, when the user unintentionally performs a volume control operation in an undesirable manner, influences of such an operation on the adjustment are minimized and the user can easily make the adjustment in a really desirable manner.

When the image signal processing unit 15 or the circuit board including the image signal processing unit 15 is replaced to upgrade the television set 1, the volume values Sv and Zv stored as history information in the volume value generator 64 of the history information memory 50 can be used to produce coefficient seed data w10 to wn9 to be stored in the information memory bank 51.

An example of the manner of generating coefficient seed data w10 to wn9 is described below. In this example, coefficient seed data w10 to wn9 used as coefficient data in the generation equation (5) are determined.

For convenience in the following discussion, variables ti (i=0 to 9) given by equation (9) are introduced.

$$t_0=1, t_1=s, t_2=z, t_3=s^2, t_4=sz, t_5=z^2, t_6=s^3, t_7=s^2z,$$
$$t_8=sz^2, t_9=z^3 \quad (9)$$

By using equation (9), equation (5) can be rewritten as equation (10).

$$W_i = \sum_{j=0}^{9} W_{ij} t_j \quad (10)$$

Finally, undetermined coefficients wij are determined by means of learning. That is, values of coefficients are determined from a plurality of SD pixel data and HD pixel data for each combination of a class and output pixels so that the square error is minimized. This technique is knows as the method of least square. Herein, let m denote the number of data used in learning, ek denote the residual for the kth learning data ($1 \leq k \leq m$), and E denote the sum of square errors. Then E can be expressed by equation (11) using equations (4) and (5). In equation (11), xik denotes kth pixel data at ith prediction tap location of a SD image, and yk denotes kth pixel data, corresponding to xik, of a HD image.

$$E = \sum_{k=1}^{m} e_k^2 \quad (11)$$

$$= \sum_{k=1}^{m} [y_k - (W_1 x_{1k} + W_2 x_{2k} + \cdots + W_n x_{nk})]^2$$

$$= \sum_{k=1}^{m} \{y_k - [(t_0 w_{10} + t_1 w_{11} + \cdots + t_9 w_{19})x_{1k} + \cdots +$$

$$(t_0 w_{n0} + t_1 w_{n1} + \cdots + t_9 w_{n9})x_{nk}]\}^2$$

-continued $$= \sum_{k=1}^{m} \{y_k - [(w_{10} + w_{11}s + \cdots + w_{19}z^3)x_{1k} + \cdots +$$

$$(w_{n0} + w_{n1}s + \cdots + w_{19}z^3)x_{nk}]\}^2$$

In the method of least squares, wij are determined so that partial differentials of equation (11) with respect to wij become 0. That is, wij can be determined in accordance with equation (12).

$$\frac{\partial E}{\partial W_{ij}} = \sum_{k=1}^{m} 2\left(\frac{\partial e_k}{\partial W_{ij}}\right) e_k = -\sum_{k=1}^{m} 2 t_j x_{ik} e_k = 0 \quad (12)$$

If Xipjq and Yip are defined by equations (13) and (14), equation (12) can be rewritten as equation (15) using a matrix.

$$X_{ip,jq} = \sum_{k=1}^{m} x_{ik} t_p x_{jk} t_q \quad (13)$$

$$Y_{ip} = \sum_{k=1}^{m} x_{ik} t_p y_k \quad (14)$$

$$\begin{bmatrix} x_{1010} & x_{1011} & x_{1012} & \cdots & x_{1019} & x_{1020} & \cdots & x_{10n9} \\ x_{1110} & x_{1111} & x_{1112} & \cdots & x_{1119} & x_{1120} & \cdots & x_{11n9} \\ x_{1210} & x_{1211} & x_{1212} & \cdots & x_{1219} & x_{1220} & \cdots & x_{12n9} \\ \vdots & \vdots & \vdots & \ddots & \vdots & \vdots & \ddots & \vdots \\ x_{1910} & x_{1911} & x_{1912} & \cdots & x_{1919} & x_{1920} & \cdots & x_{19n9} \\ x_{2010} & x_{2011} & x_{2012} & \cdots & x_{2019} & x_{2020} & \cdots & x_{20n9} \\ \vdots & \vdots & \vdots & \ddots & \vdots & \vdots & \ddots & \vdots \\ x_{n910} & x_{n911} & x_{n912} & \cdots & x_{n919} & x_{n920} & \cdots & x_{n9n9} \end{bmatrix} \begin{bmatrix} w_{10} \\ w_{11} \\ w_{12} \\ \vdots \\ w_{19} \\ w_{20} \\ \vdots \\ w_{n9} \end{bmatrix} = \begin{bmatrix} Y_{10} \\ Y_{11} \\ Y_{12} \\ \vdots \\ Y_{19} \\ Y_{20} \\ \vdots \\ Y_{n9} \end{bmatrix} \quad (15)$$

This equation is generally called a normal equation. This normal equation can be solved with respect to wij using, for example, the sweeping-out method (Gauss-Jordan's elimination method) thereby obtaining the coefficient seed data.

Figure 11:
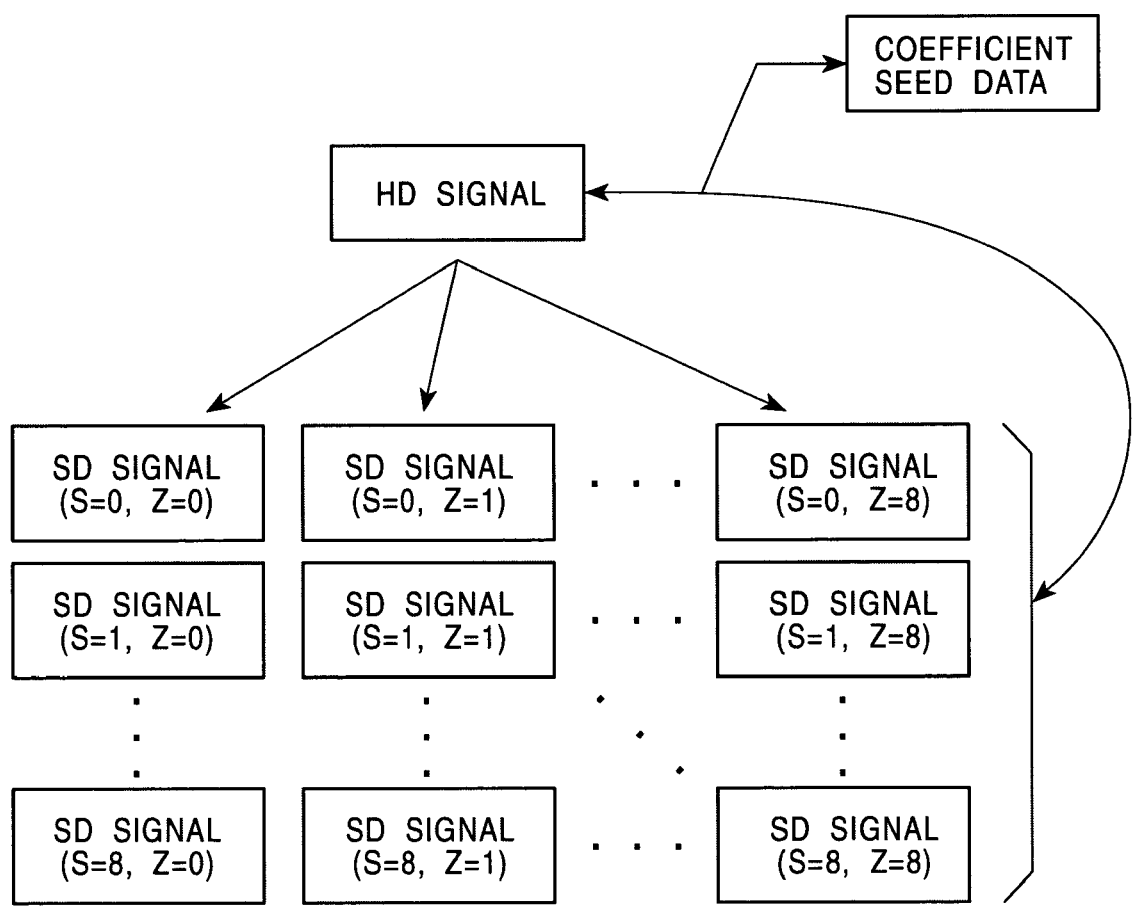
FIG. 11 is a diagram showing an example of a method of generating coefficient seed data.

FIG. 11 shows the concepts of the method of generating the coefficient seed data.

A plurality of SD signals are generated from a HD signal. For example, a total of 81 SD signals are generated by varying, in 9 steps, the parameters S and Z determining the spatial band (in the vertical and horizontal directions) and the temporal band (in the frame-to-frame direction) of the filter used in generating the SD signals from the HD signal, and learning is performed between the generated SD signals and the HD signal thereby generating coefficient seed data.

Figure 12:
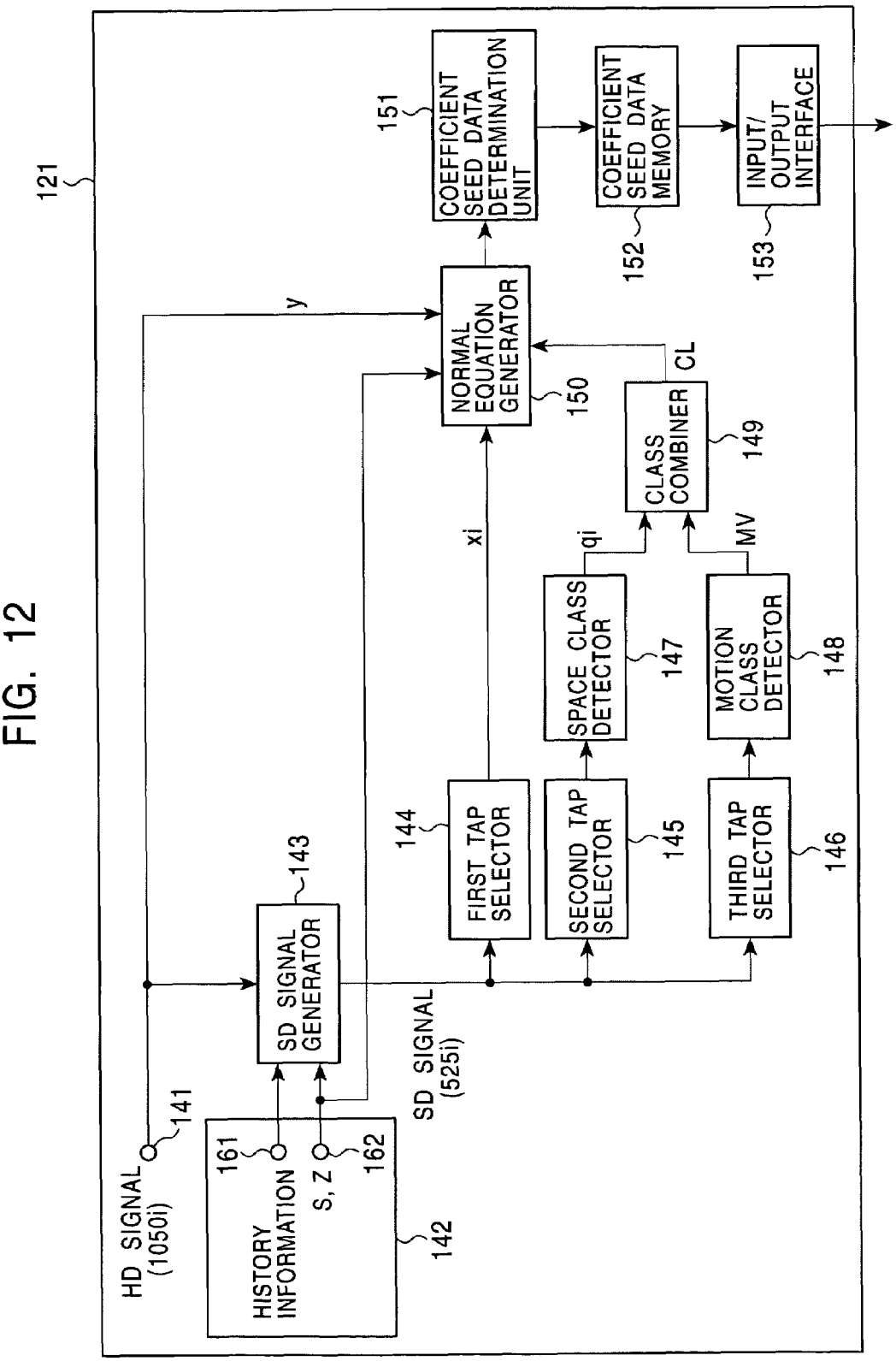
FIG. 12 is a block diagram showing an example of a construction of coefficient seed data generator.

FIG. 12 is a block diagram showing the construction of a coefficient seed data generator 121 for generating coefficient seed data w10 to wn9 to be stored in the information memory bank 51 of the television set 1.

A HD signal (1050i signal) used as a teacher signal is input via an input terminal 141. A SD signal generator 143 thins out the HD signal in the vertical and horizontal directions in accordance with the history information and the parameters S and Z input via the input terminals 142, thereby obtaining a SD signal used as a student signal.

In accordance with the parameters S and Z input via the input terminals 142, the SD signal generator 143 varies the spatial and temporal bands of a band-limiting filter used in conversion from the HD signal to the SD signal.

In the above process, the volume values Sv and Zv stored in the volume value generator 64 of the history information memory 50 are input as the history information to the SD signal generator 143.

When coefficient seed data w10 to wn9, to be stored in the information memory bank 51 of a television set 1 going to be used for the first time, are generated, no history information is input to the SD signal generator 143 because no history information is yet stored in the volume value generator 64 of the history information memory 50.

That is, history information is input to the SD signal generator 143, for example, to generate coefficient seed data w10 to wn9 to be stored in the information memory bank 51 when the image signal processing unit 15 or the circuit board including the image signal processing unit 15 is replaced to upgrade the television set 1.

In the image signal processing unit 15 described earlier with reference to FIG. 1, the terminals 142 are connected to the system controller 12 so that the coefficient seed data generator 121 and the history information memory 50 can communicate with each other. More specifically, the terminal 161 of the input terminals 142 is connected to the history information memory 50 so that the coefficient seed data generator 121 can receive history information.

The SD signal generator 143 adjusts the values of the input parameters S and Z on the basis of the history information and varies the spatial and temporal bands depending on the adjusted parameters S and Z. In the case in which no history information is input, the spatial and temporal bands are varied directly depending on the input values of the parameters S and Z.

In the television set 1, the values of the parameters S and Z are adjusted within the range from 0 to 8 in predetermined steps in response to a control operation performed by a user to adjust the spatial and temporal resolutions.

Figure 13:
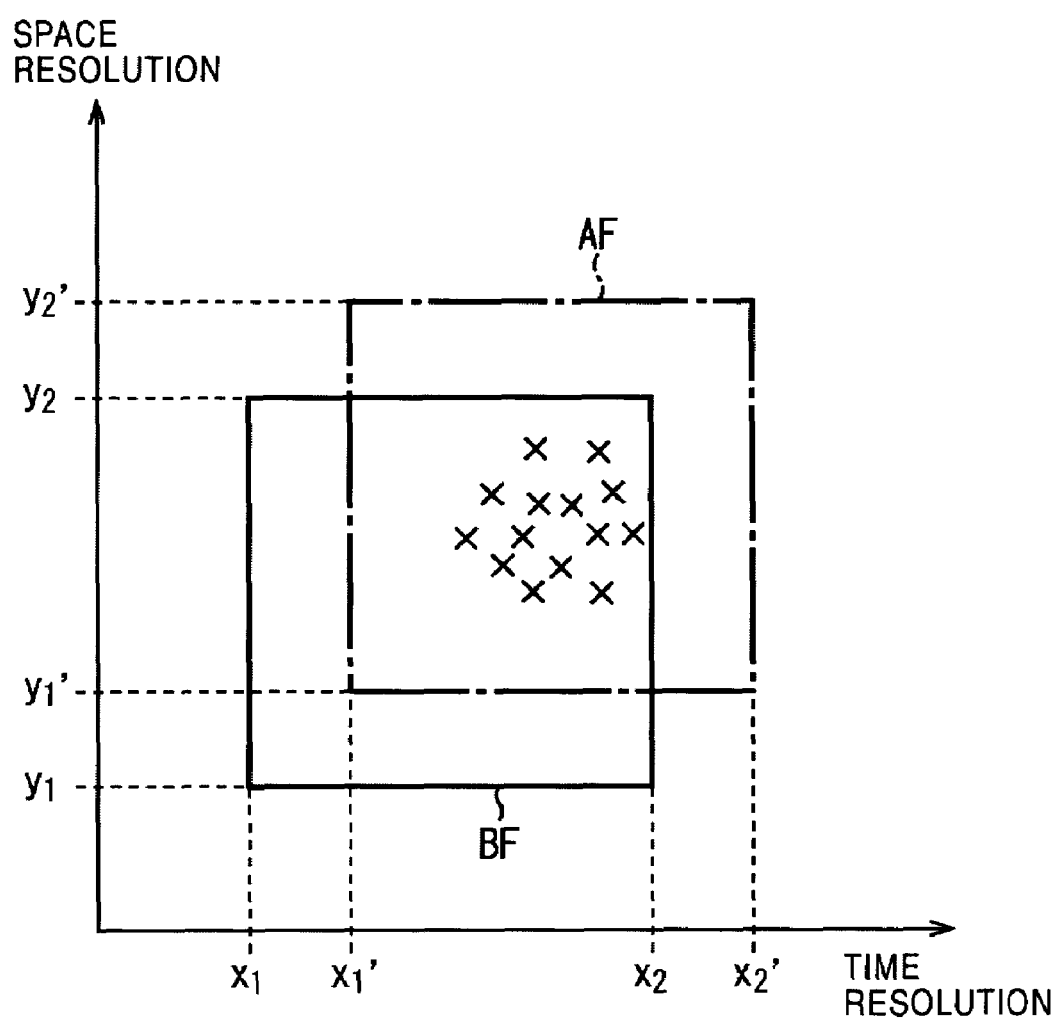
FIG. 13 is a diagram showing a change in range within which resolutions are adjusted.

In this case, if the spatial and temporal bands are varied in the SD signal generator 143 directly depending on the input values of the parameters S and Z, then in the television set 1 coefficient seed data w10 to wn9 are generated so that the resolutions can be adjusted within the range represented by a solid line BF in FIG. 13 (within the range from y1 to y2 for the spatial resolution and within the range from x1 to x2 for the temporal resolution).

In the case in which history information is input, the SD signal generator 143 determines the location of the barycenter of the frequency distribution of parameters S and Z. In this case, for a particular number of newest values of parameters S and Z, newer values are weighted by greater factors. On the basis of the location of the barycenter, the SD signal generator 143 adjusts the input values of parameters S and Z. In this case, the bandwidth are reduced with increasing values of parameters S and Z. Thus, in the television set 1 having the adjusted parameters, the resolutions are increased with increasing values of parameters S and Z.

The input values of parameters S and Z are converted by means of linear transformation such that the center of the allowable range of parameters S and Z adjusted in the television set 1 is moved to the location of the barycenter determined above. For example, when the center values of the ranges of parameters S and Z adjusted in the television set 1 are S0 and Z0, respectively, and the locations of barycenter are Sm and Zm, respectively, if the input values of parameters S and Z are S1 and Z1, then the adjusted values S2 and Z2 of parameters S and Z are given by the following conversion equations (16) and (17).

$$S_2 = S_1 + (S_m - S_0) \quad (16)$$

$$Z_2 = Z_1 + (Z_m - Z_0) \quad (17)$$

If the spatial and temporal bands are varied depending on the values of parameters S and Z adjusted in the above-descried manner, then, in the television set 1, coefficient seed data w10 to wn9 are generated so as to allow the adjustment of resolutions to be performed within a range denoted by a single-dotted line AF shown in FIG. 13 (within a range from y1' to y2' for the spatial resolution and from x1' to x2' for the temporal resolution) centered at the barycenter of locations (denoted by symbols "x") at which resolutions have been adjusted within a range denoted by a solid line BF in FIG. 13.

In the process described above, when the location of barycenter of the frequency distribution of each of parameters S and Z is determined, the predetermined number of new values of parameters S and Z are weighted such that greater weighting factors are assigned to newer values. However, it is not necessarily needed to weight the values. That is, the location of barycenter may be determined for unweighted values. Still alternatively, the location of barycenter may be simply determined for weighted values of a predetermined number of new values of each of parameters S and Z without taking account the frequency distribution. Still alternatively, values of parameters S and Z having the greatest counts in the frequency distribution of the values of parameters S and Z may be determined, and those values may be used instead of the location of barycenter. Still alternatively, the newest values of parameters S and Z of predetermined numbers of new values of parameters S and Z may be used instead of the location of barycenter.

Referring again to FIG. 12, the construction of the coefficient seed data generator 121 is further described below.

A first tap selector 144, a second tap selector 145, and a third tap selector 146 selectively extract data of a plurality of SD pixels in the vicinity of a location of interest in the HD signal (1050i signal) from the SD signal (525i signal) output from the SD signal generator 143, and the first to third tap selectors output the extracted SD pixel data. Those first to third tap selectors 144, 145, and 146 are constructed in a similar manner to the first to third tap selectors 41, 42, and 43 of the image signal processing unit 15 described earlier with reference to FIG. 1.

The spatial class detector 147 detects the level distribution pattern of the spatial class tap data (SD pixel data) selectively extracted by the second tap selector 145. The spatial class detector 147 determines a spatial class on the basis of the detected level distribution pattern and outputs class information indicating the determined motion class. The spatial class detector 147 is constructed in a similar manner to the spatial class detector 44 of the image signal processing unit 15 described earlier with reference to FIG. 1. The spatial class detector 147 outputs, as class information indicating a spatial class, a requantized code qi of each SD pixel data employed as spatial class tap data.

The motion class detector 148 detects a motion class, chiefly indicating the degree of motion, from the data of motion class taps (SD pixel data) selectively extracted by the third tap selector 146, and the motion class detector 148 outputs the resultant class information MV. The motion class detector 148 is constructed in a similar manner to the motion class detector 45 of the image signal processing unit 15 described earlier with reference to FIG. 1. The motion class detector 148 calculates interframe differences from the motion class tap data (SD pixel data) selectively extracted by the third tap selector 146. The motion class detector 148 compares the mean value of the absolute values of differences with threshold values thereby detecting a motion class, which is a measure of the degree of motion.

On the basis of the requantized code qi output from the spatial class detector 147 as the class information indicating the spatial class and class information MV indicating the motion class output from the motion class detector 148, the class combiner 149 obtains a class code CL indicating a class of the pixel of interest of the HD signal (1050i signal). The class combiner 149 is constructed in a similar manner to the class combiner 46 of the image signal processing unit 15 described earlier with reference to FIG. 1.

A normal equation generator 150 generates a normal equation (equation (15)) used to obtain coefficient seed data w10 to wn9, for each class, from each HD pixel data y at a location of interest in the HD signal supplied via the input terminal 141, prediction tap data (SD pixel data) xi corresponding to the HD pixel data y and selectively extracted by the first tap selector 144, values of parameters S and Z, and a class code CL corresponding to the HD pixel data y and output from the class combiner 149.

In this case, learning data including a combination of one HD pixel data y and corresponding n prediction tap data (SD pixel data) xi is produced such that a plurality of SD signals are sequentially produced by the SD signal generator 143 while varying the spatial band and the temporal band depending on the variations in adjusted values of parameters S and Z thereby producing learning data including a HD signal and the plurality of SD signals. The normal equation generator 150 produces normal equations associated with a large number of learning data corresponding to various values of parameters S and Z, whereby coefficient seed data w10 to wn9 can be determined from the normal equations.

In the above process, after learning data including a combination of one HD pixel data y and corresponding n prediction tap data (SD pixel data) xi is produced, the normal equation generator 150 produces a normal equation for each of output pixels (HD1 to HD4 shown in FIG. 3 or HD1' to HD4' shown in FIG. 4). For example, a normal equation corresponding to HD1 is produced from learning data including HD pixel data y at a similar location relative to the central prediction tap to that of HD1.

The data of the normal equation generated by the normal equation generator 150 for each combination of a class and output pixels is supplied to a coefficient seed data determination unit 151. The coefficient seed data determination unit 151 solves the normal equation using, for example, the sweeping-out method, thereby determining coefficient seed data w10 to wn9 for each combination of a class and output pixels. The coefficient seed data determined by the coefficient seed data determination unit 151 is stored in a coefficient seed data memory 152. As required, an input/output interface 153 is connected to another device (such as the information memory bank 51 of the image signal processing unit 15 described earlier with reference o FIG. 1) and the coefficient seed data stored in the coefficient seed data memory 152 is output.

Now, the operation of the coefficient seed data generator 121 shown in FIG. 12 is described below.

A HD signal (1050i signal) used as a teacher signal is input via an input terminal 141. A SD signal generator 143 thins out the HD signal in the vertical and horizontal directions thereby obtaining a SD signal (525i signal) used as a student signal.

In the above process, values of parameters which determine the spatial band and the temporal band of the band-limiting filter used in the generation of the SD signals from the HD signal, that is, parameters S and Z which determine the spatial resolution and the temporal resolution of the SD signals to be produced, are input to the SD signal generator 143.

Furthermore, when the image signal processing unit 15 or the circuit board including the image signal processing unit 15 is replaced to upgrade the television set 1, parameters S and Z input in the past by the user and stored as history information in the volume value generator 64 of the history information memory 50 of the original image signal processing unit 15 may be input via the input terminal 142 to the SD signal generator 143 to produce coefficient seed data w10 to wn9 to be stored in the information memory bank 51.

If history information is input, the SD signal generator 143 adjusts the values of the input parameters S and Z on the basis of the history information. For example, the location of the barycenter of parameters S and Z is determined from the input history information, and the input values of parameters S and Z are converted by means of a linear transformation such that the center of the allowable range of parameters S and Z adjusted in the television set 1 is moved to the location of the barycenter determined above. In accordance with the adjusted values of parameters S and Z, the SD signal generator 143 varies the spatial and temporal bands of a band-limiting filter used in conversion from the HD signal to the SD signal.

When coefficient seed data w10 to wn9, to be stored in the information memory bank 51 of a television set 1 going to be used for the first time, are generated, no history information is input. In this case, the spatial and temporal bands of the band-limiting filter used in generation of the SD signal from the HD signal are varied directly depending on the input values of the parameters S and Z.

By changing stepwise the values of parameters S and Z input to the SD signal generator 143 in predetermined steps, the spatial and temporal bands of the band-limiting filter used in generating the SD signal from the HD signal are varied, thereby generating a plurality of SD signals whose spatial and temporal bands vary stepwise.

Furthermore, from the SD signal (525i signal) generated by the SD signal generator 143, the second tap selector 145 selectively extracts spatial class tap data (SD pixel data) at locations in the vicinity of the location of interest in the HD signal (1050i signal). The spatial class tap data (SD pixel data) selectively extracted by the second tap selector 145 is supplied to the spatial class detector 147. The spatial class detector 147 performs the ADRC processing on the respective SD pixel data given as the spatial class tap data thereby obtaining a requantized code qi serving as class information indicating a spatial class (a class indicating a spatial waveform) (refer to equation (1)).

From the SD signal generated by the SD signal generator 143, the third tap selector 146 selectively extracts motion tap data (SD pixel data) at locations in the vicinity of the location of interest in the HD signal. The motion class tap data (SD pixel data) selectively extracted by the third tap selector 146 is supplied to the motion class detector 148. The motion class detector 148 obtains class information MV indicating a motion class (a class indicating the degree of motion) from the respective SD pixel data given as the motion class tap data.

The class information MV and the requantized code qi are supplied to the class combiner 149. On the basis of the supplied class information MV and requantized code qi, the class combiner 149 determines a class code CL indicating a class of pixel data at the location of interest in the HD signal (1050i signal) (refer to equation (3)).

From the SD signal generated by the SD signal generator 143, the first tap selector 144 selectively extracts prediction tap data (SD pixel data) at locations in the vicinity of the location of interest in the HD signal.

A normal equation generator 150 generates a normal equation (equation (15)) used to obtain coefficient seed data w10 to wn9, for each class, from each HD pixel data y at a location of interest in the HD signal supplied via the input terminal 141, prediction tap data (SD pixel data) xi corresponding to the HD pixel data y and selectively extracted by the first tap selector 144, values of parameters S and Z, and a class code CL corresponding to the HD pixel data y and output from the class combiner 149.

The coefficient seed data determination unit 151 solves each normal equation thereby determining coefficient seed data w10 to wn9 for each combination of a class and output pixels. The obtained coefficient seed data w10 to wn9 are stored in the coefficient seed data memory 152. As required, the coefficient seed data memory 152 are output to the outside via the input/output interface 153.

As described above, the coefficient seed data generator 121 shown in FIG. 12 can generate coefficient seed data w10 to wn9 to be stored in the information memory bank 51 of the image signal processing unit 15 shown in FIG. 1. The generated coefficient seed data are used as coefficients, for each combination of a class and output pixels (HD1 to HD4 or HD1' to HD4'), in the generation equation (5) to determine coefficient data Wi used in the prediction equation.

When the image signal processing unit 15 or the circuit board including the image signal processing unit 15 is replaced to upgrade the television set 1, volume values Sv and Zv stored in the volume value generator 64 of the history information memory 50 of the television set 1 are input via the input terminal 142 to the SD signal generator 143 to produce coefficient seed data w10 to wn9 to be stored in the information memory bank 51.

The SD signal generator 143 adjusts the input values of the parameters S and Z on the basis of the history information and varies the spatial and temporal bands of the band-limiting filter used in generating the SD signal from the HD signal using the adjusted values of the parameters S and Z.

If the coefficient seed data w10 to wn9 obtained in the above-described manner are stored in the information memory bank 51 in an image signal processing unit 15 or a circuit board including the image signal processing unit 15 newly installed in the television set 1 when the television set 1 is upgraded, it becomes possible for a user to adjust the resolutions within a range (represented by a single-dotted line AF in FIG. 13) centered at the location of barycenter of resolutions used in the past, by adjusting the values of the parameters S and Z. That is, the allowable resolution range is automatically set in accordance with the preference of the user, and the user can adjust the resolutions within the range.

Another embodiment is described below with reference to FIG. 14.

Figure 14:
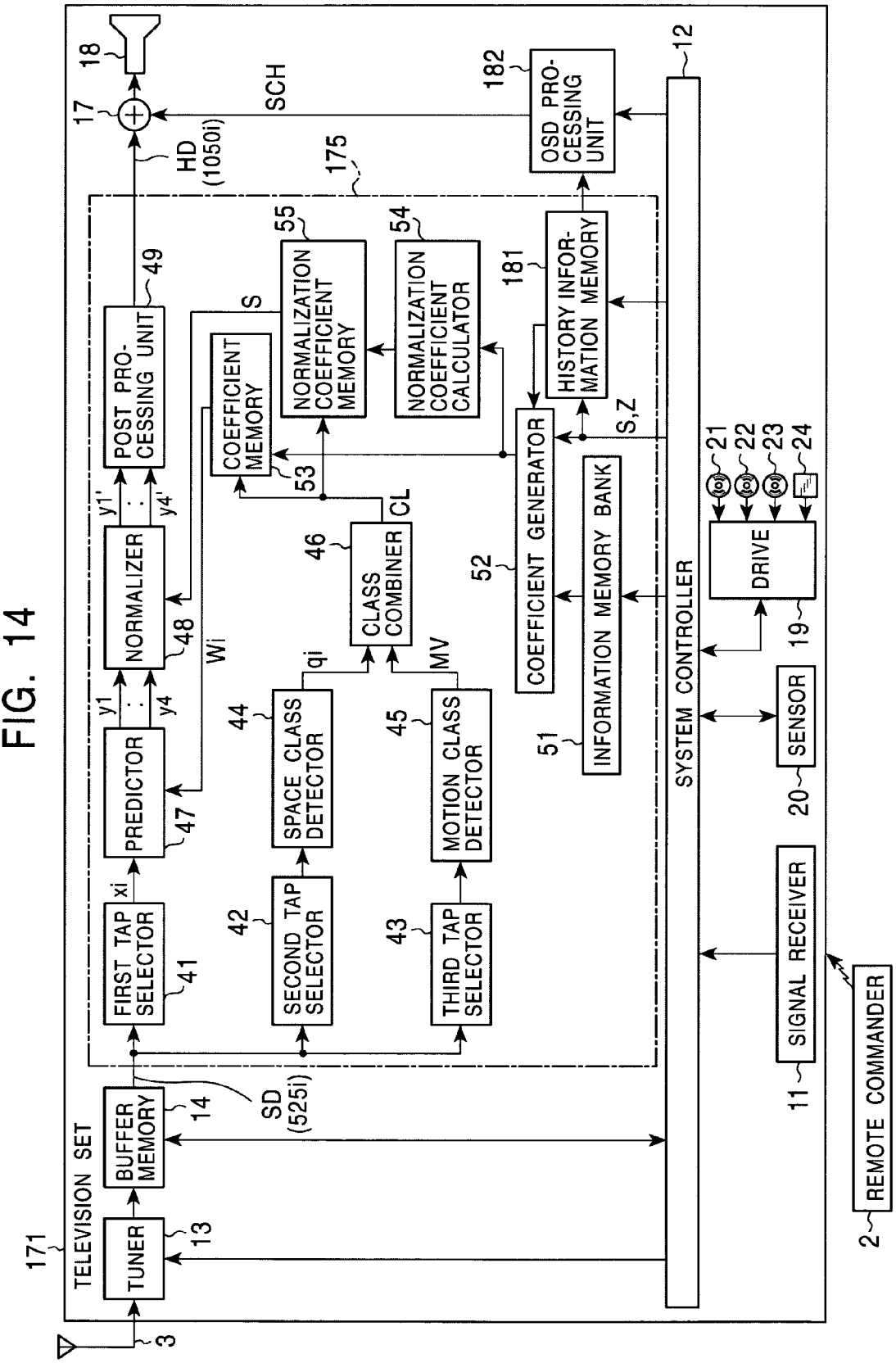
FIG. 14 is a block diagram showing another construction of television set according to the present invention.

FIG. 14 is a block diagram showing the construction of a television set 171. In FIG. 14, similar parts to those in FIG. 1 are denoted by similar reference numerals, and they are not described in further detail herein.

The television set 171 is similar to the television set 1 described earlier with reference to FIG. 1 except that the image signal processing unit 15 shown in FIG. 1 is replaced with an image signal processing unit 175, and the OSD processing unit 16 is replaced with an OSD processing unit 182. The image signal processing unit 175 is similar to the image signal processing unit 15 described earlier with reference to FIG. 1 except that the history information memory 50 is replaced with a history information memory 181 and that the feature value extractor 56 is removed. In this television set 171, as in the television set 1, coefficient seed data w10 to wn9 to be stored in the information memory bank 51 of the image signal processing unit 175 are generated by the coefficient seed data generator 121 described above with reference to FIG. 12.

From the system controller 12, a control signal and parameters S and Z, which are adjustment values (associated with, for example, a spatial resolution, a temporal resolution, and noise) are input to the history information memory 181 of the image signal processing unit 175. The history information memory 181 stores the received volume data. The history information memory 181 automatically creates a new volume axis on the basis of the stored volume data and outputs, as required, information associated with the new volume axis to the OSD processing unit 182. On the basis of the information associated with the new volume axis received from the history information memory 181, the OSD processing unit 182 generates OSD data associated with the new volume axis corresponding to the adjustment screen 71 described earlier with reference to FIGS. 6 and 7 and displays it on the display 18.

Figure 15:
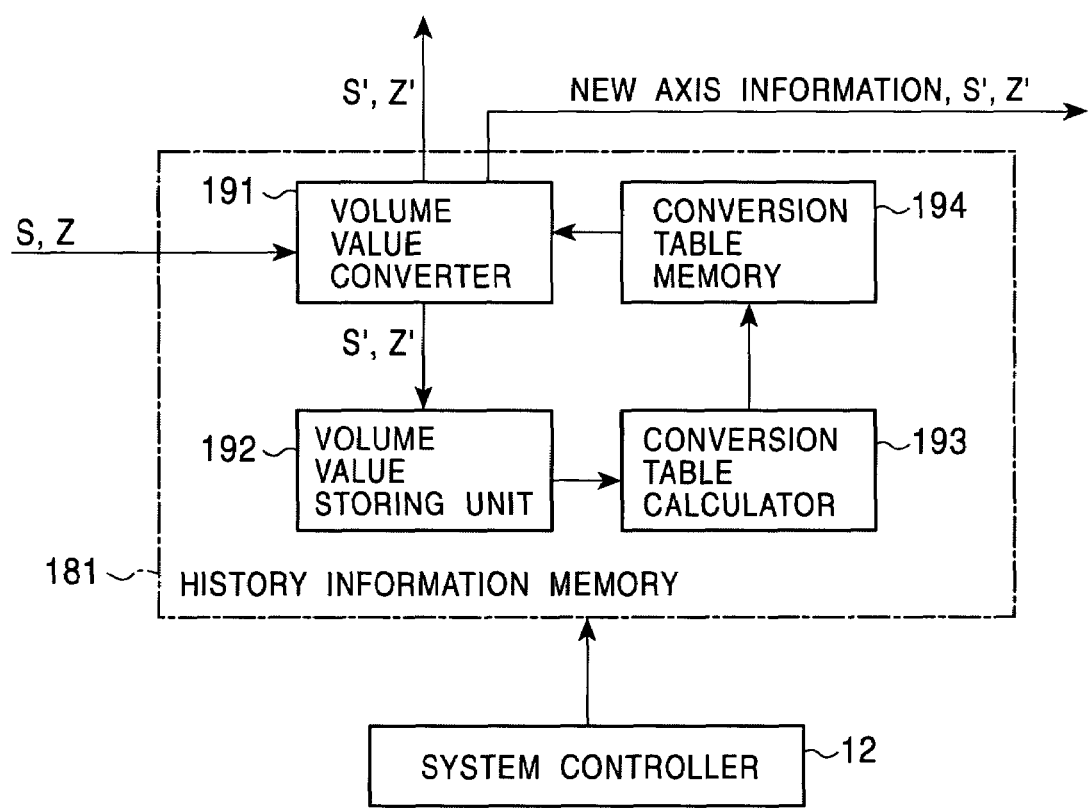
FIG. 15 is a block diagram showing the details of a history information memory shown in FIG. 14.

FIG. 15 is a block diagram showing the construction of the history information memory 181.

If a volume value converter 191 receives input parameters S and Z indicating preference of a user from the system controller 12, the volume value converter 191 converts the parameters S and Z into volume values S' and Z' in accordance with a conversion table stored in a conversion table memory 194. The resultant volume values S' and Z' are supplied to a coefficient generator 52 or a volume value storing unit 192. If the volume axis is changed as will be described later, the volume value converter 191 outputs new axis information used to produce data indicating the locations, on the new volume axes on the adjustment screen, of the volume values S' and Z' corresponding to the adjustment values input by the user and supplied to the volume value converter 191 via the system controller 12 and also outputs volume values S' and Z' corresponding to the new volume axes. The output data are supplied to the OSD processing unit 182.

If the volume value storing unit 192 receives the volume values S' and Z' from the volume value converter 191, the volume value storing unit 192 stores a predetermined number of sets (for example, 20 sets) of volume values S' and Z'. The stored data is used to produce the conversion table. The stored data is also used as history information in generating coefficient seed data descried above.

As required, a conversion table calculator 193 calculates a conversion table corresponding to a volume axis on the basis of the data S' and Z' stored in the volume value storing unit 192 and outputs the resultant conversion table to the conversion table memory 194. The conversion table memory 194 stores the received conversion table. The conversion table may be updated, for example, when a user issues a command via the remote commander 2 to use a new volume axis or when a greater number of sets of volume values than a predetermined value are stored in the volume value storing unit 192. If the conversion table memory 194 receives the updated conversion table from the conversion table calculator 193, the conversion table memory 194 stores the received conversion table.

If the OSD processing unit 182 shown in FIG. 14 receives the new axis information and the converted volume values S' and Z' from the volume value converter 191, the OSD processing unit 182 generates OSD data for displaying an icon 72 at a location corresponding to the volume values being currently adjusted by the user, on an adjustment screen similar to the adjustment screen 71 described earlier with reference to FIGS. 6 and 7. The generated OSD data is output to the mixer 17 and displayed on the display 18.

Figure 16:
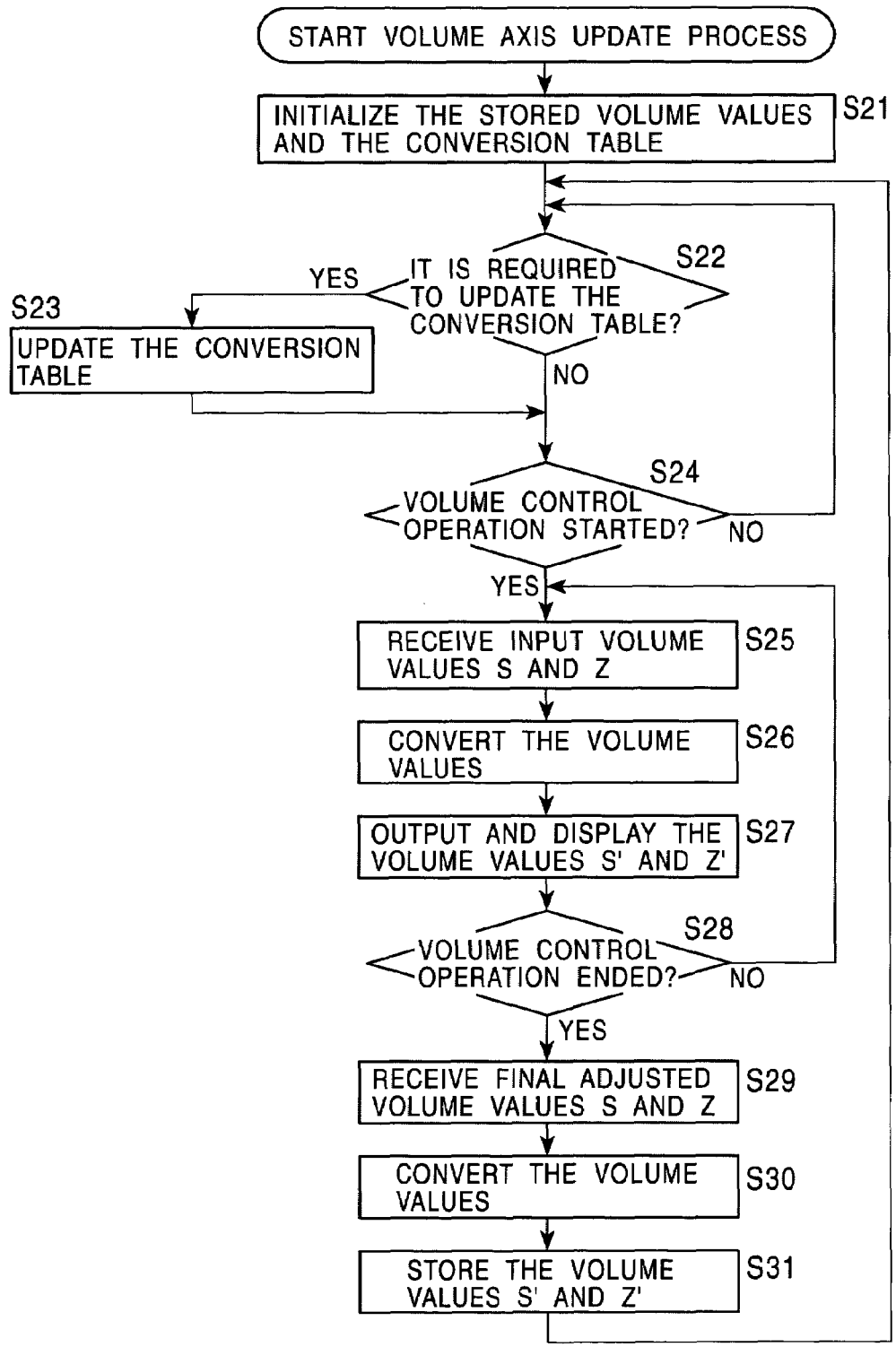
FIG. 16 is a flow chart showing a process of changing volume axes.

The process of updating the volume axis is described below with reference to a flow chart shown in FIG. 16.

In step S21, the volume value storing unit 192 initializes the volume values stored therein, and the conversion table memory 194 initializes the conversion table stored therein.

In step S22, the conversion table calculator 193 determines whether to update the conversion table, for example, depending on whether the conversion table calculator 193 receives a control signal indicating that a user has issued via the remote commander 2 a command to use a new volume axis or whether it is detected that a greater number of sets of volume values than the predetermined number are stored in the volume value storing unit 192.

If it is determined in step S22 that the conversion table should be updated (because the command has been issued by the user or a greater number of sets of volume values than the predetermined number are stored in the volume value storing unit 192), the process proceeds to step S23. In step S23, the conversion table calculator 193 calculates the conversion table using the data S' and Z' stored in the volume value storing unit 192 and outputs the resultant conversion table to the conversion table memory 194. The conversion table memory 194 replaces the current conversion table with the received conversion table.

Figure 17:
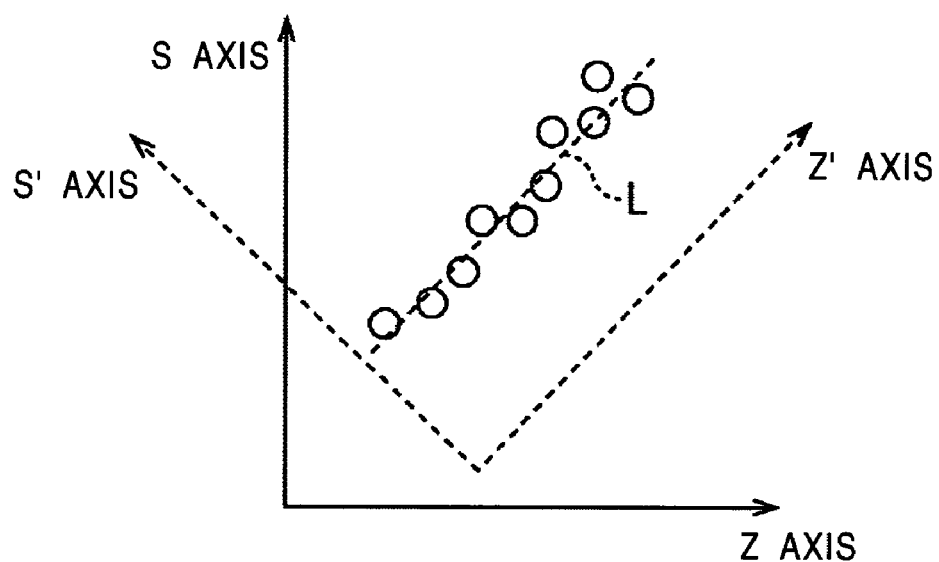
FIG. 17 is a diagram showing a change of volume axes.
Figure 18:
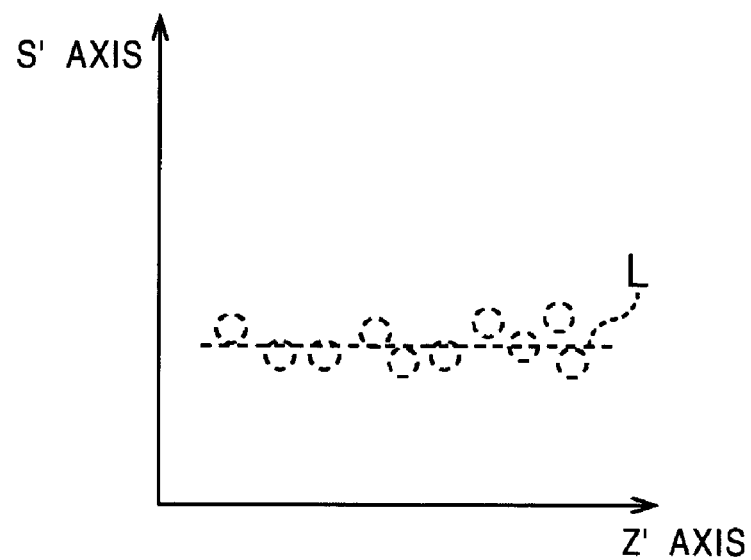
FIG. 18 is a diagram showing a change of volume axes.

In a case in which volume adjustment values specified by a user have a simple distribution in the initial volume axis space, for example, such as that shown in FIG. 17 (in the example shown in FIG. 17, the distribution of volume adjustment values can be approximated by a linear line), the conversion table calculator 193 approximates the distribution of the volume values by a linear expression using the principal component analysis or the like. In accordance with the approximate linear expression, the conversion table calculator 193 produces new volume axes as shown in FIG. 18 and calculates the conversion table representing the conversion between the initial volume axis space and the new volume axis space. The calculated conversion table is output to the conversion table memory 194 and stored therein.

In the examples shown in FIGS. 17 and 18, a fitting line L is determined in the coordinate space in which the S and Z axes are used as volume axes, and S' axis and Z' axis are determined as new volume axes such that the fitting line L becomes parallel to the Z' axis.

In the determination of new volume axes, instead of the principal component analysis using linear approximation, approximation may be performed by another method such as approximation using a higher-order expression or approximation using a VQ (Vector Quantization) table and VQ codes.

In the case in which it is determined in step S22 that it is not needed to update the conversion table, the process proceeds to step S24. The process also proceeds to step S24 when step S23 is completed. In step S24, the system controller 12 determines whether the user has started a volume control operation, on the basis of a signal received via the signal receiver 11.

If it is determined in step S24 that the volume control operation by the user is not started, the process returns to step S22 to repeat step S22 and following steps.

However, if it is determined in step S24 that the volume control operation by the user has been started, the process proceeds to step S25. In step S25, the system controller 12 outputs a control signal to the history information memory 181 to notify that the volume control operation has been started, and the system controller 12 transfers parameters S and Z, which are parameters used to make an image adjustment, to the volume value converter 191.

In step S26, the volume value converter 191 calculates the volume values S' and Z' using the parameters S and Z received from the system controller 12 in accordance with the conversion table stored in the conversion table memory 194. Herein, if the conversion table stored in the conversion table memory 194 is that initialized in step S21, the volume values S' and Z' become equal to the parameters S and Z, respectively. The volume value converter 191 outputs the converted volume values S' and Z' to the coefficient generator 52. Furthermore, the volume value converter 191 outputs the volume values S' and Z' to the OSD processing unit 182. Herein, if the conversion table has been updated, new axis information is also supplied to the OSD processing unit 182.

Figure 19:
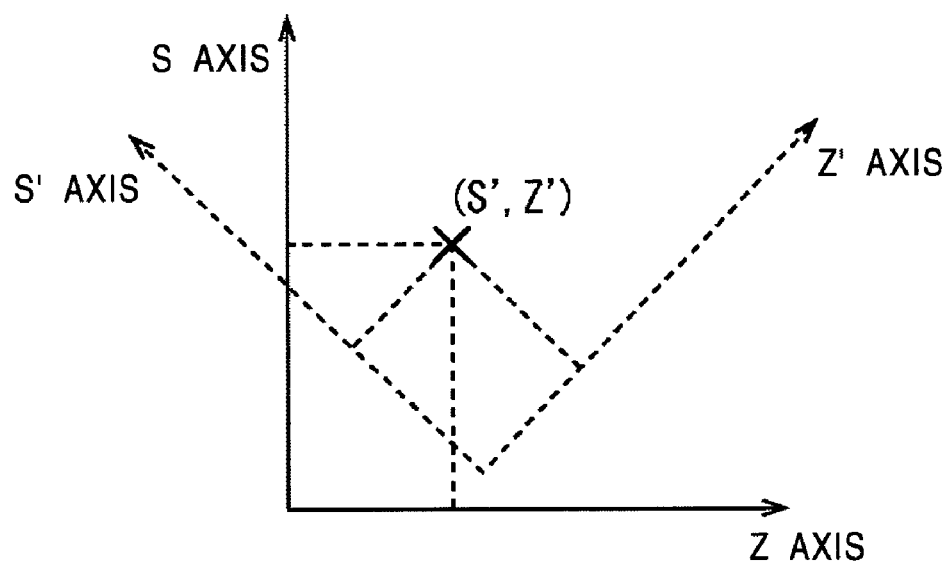
FIG. 19 is a diagram showing a change of volume axes.
Figure 20:
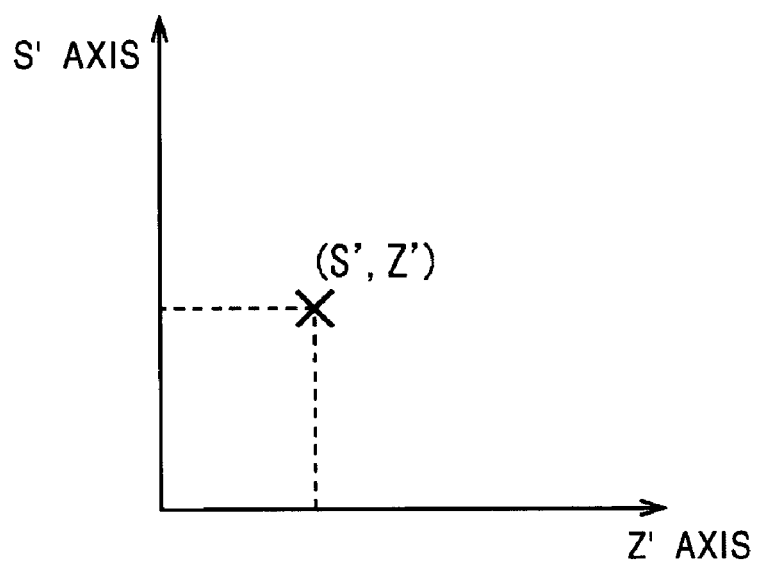
FIG. 20 is a diagram showing a change of volume axes.

If the OSD processing unit 182 receives the new axis information from the volume value converter 191, the OSD processing unit 182 produces, in step S27, display image data associated with the new volume axes, corresponding to the adjustment screen 71 described earlier with reference to FIGS. 6 and 7. The OSD processing unit 182 then produces data corresponding to the icon 72 displayed at a location corresponding to the volume values S' and Z' in the current volume axis space shown in FIG. 20 (corresponding to FIG. 18) from the volume values S' and Z' in the initial volume axis space shown in FIG. 19 (corresponding to FIG. 17). The OSD processing unit 182 outputs the OSD data corresponding to the adjustment screen 71 and the icon 72 to the mixer 17 to display it on the display 18.

In step S28, the system controller 12 determines whether the volume control operation by the user has been ended, on the basis of a signal received via the signal receiver 11. If it is determined in step S28 that the volume control operation is not ended, the process returns to step S25 to repeat step S25 and following steps.

If it is determined in step S28 that the volume control operation has been ended, the process proceeds to step S29. In step S29, the system controller 12 output a control signal to the history information memory 50 to notify that the volume control operation has been ended, and the system controller 12 transfers parameters S and Z indicating final adjustment values associated with image quality to the volume value converter 191.

In step S30, the volume value converter 191 calculates the volume values S' and Z' using the parameters S and Z indicating the final adjustment values received from the system controller 12 in accordance with the conversion table currently stored in the conversion table memory 194. In step S31, the calculated volume values S' and Z' are output to the volume value storing unit 192 and stored therein. Thereafter, the process returns to step S22 to repeat step S22 and following steps.

Thus, by changing the volume axes in the process described above with reference to FIG. 16, it becomes possible for the user to easily adjust parameters on the parameter setting screen including the new coordinate axes displayed in the OSD manner.

For example, when a user adjusts a value along a line L in the volume axis coordinate space shown in FIG. 17 (FIG. 19), the user has to adjust both parameters in the S axis and Z axis. In contrast, in the case in which a value is adjusted along a line L in the volume axis coordinate space shown in FIG. 18 (FIG. 20), it is required to adjust only one parameter in the Z' axis while maintaining the parameter in the S' axis at a fixed value. This makes it possible for the user to quickly make a precise adjustment.

Furthermore, when the new volume axes are used, it is needed to store only values in one volume axis. This allows a reduction in the amount of stored data, compared with the case in which values in two volume axes are stored.

In the embodiment described above, two parameters associated with image quality are adjusted. When there are more parameters to be adjusted, the conversion of volume axes can allow a reduction in the number of parameters to be adjusted. Thus, the user can easily make an adjustment by performing a simple control operation. Furthermore, the amount of data stored as history information can be reduced.

The volume axis conversion may be performed using a method other than the principal component analysis using linear approximation employed in the above embodiment. For example, approximation using a high-order curve may be employed, or values may be expressed in VQ codes and a conversion may be expressed using a VQ table. In the case in which approximation using a high-order curve is employed, a conversion table based on the approximation using the high-order curve is stored in the conversion table memory 194, and volume values S' and Z' calculated using the conversion table based on the approximation using the high-order curve are stored in the volume value storing unit 192. In the case in which values are expressed in VQ codes and the conversion is expressed using a VQ table, the VQ table is stored in the conversion table memory 194, and VQ codes are stored in the volume value storing unit 192.

After volume values corresponding to an extracted feature value of an input image or an extracted feature value associated with an environmental condition are calculated as is performed in the television set 1 described earlier with reference to FIG. 1, the calculated volume values may be stored, as in the television set 171 described earlier with reference to FIG. 14, so that new volume axes can be calculated from the stored volume values.

In a case in which stored data expressed in two volume axes can be classified into specific patterns on the basis of temporal analysis or feature values of images or environmental parameters, if, instead of storing data expressed not in two volume axes, the patterns are expressed in a VQ table and data are expressed in VQ codes, then the data size of stored history information can be reduced.

In the television set 1 or the television set 171, if the history information memory 50 or a circuit board including the history information memory 181 (for example, the image signal processing unit 15 or the image signal processing unit 175) is constructed in the form of a removable unit, it becomes possible to upgrade the television set 1 or the television set 171 by replacing the unit.

If history information indicating preferences associated with images is collected from a great number of users, the collected history information is very useful in designing parameters associated image quality of new television sets or other display devices. That is, if the history information memory 50 or a circuit board including the history information memory 181 is constructed in the form of a removable unit, it becomes possible to collect stored history information for use in designing parameters to achieve better image quality.

In the image signal processing unit 15 described above with reference to FIG. 1 or in the image signal processing unit 175 described above with reference to FIG. 14, a linear expression is used as the prediction equation in generating HD signals. The prediction equation used in generating HD signals is not limited to linear expressions but high-order expressions may also be employed.

The television set 1 shown in FIG. 1 and the television set 171 shown in FIG. 14 may include, or may be connectable to, a recording/playing back apparatus for recording/reproducing content data onto/from recording medium (not shown) such as a magnetic tape, an optical disk, a magnetic disk, a magnetooptical disk, or a semiconductor memory.

This makes it possible for the television set 1 or the television set 171 to record a HD signal converted from received SD-signal broadcast data on storage medium and/or read SD-signal video data from a storage medium and convert it into a HD signal to play back it or to record it on another storage medium. That is, the present invention can be applied not only to broadcast data but any type of content data.

In the image signal processing unit 15 or the image signal processing unit 175 described above, a SD signal (525i signal) is converted into a HD signal (1050i signal). However, in the present invention, the conversion is not limited to that from a SD signal to a HD signal. The present invention may also be advantageously used when a first video signal is converted into a second video signal using a prediction equation.

Furthermore, in the image signal processing unit 15 or the image signal processing unit 175 described above, the information signal is a video signal. However, in the present invention, the information signal is not limited to video signals. The present invention may also be advantageously employed when the information signal is an audio signal.

In the coefficient seed data generator 121 described above with reference to FIG. 12, the SD signal generator 143 produces a SD signal used as a student signal from a HD signal used as a teacher signal, and learning is performed. A HD signal used as a teacher signal and a SD signal used as a student signal may be simultaneously acquired using an imaging device or the like and learning may be performed using those HD signal and SD signal acquired separately.

In the history information memory 50 of the image signal processing unit 15 or in the history information memory 181 of the image signal processing unit 175 described above, history information associated with parameters are stored (more specifically, the history information is stored in the volume value generator 64 of the history information memory 50 or in the volume value storing unit 192 of the history information memory 181), and coefficient seed data w10 to wn9 are stored in the information memory bank 51. The history information memory 50 or the history information memory 181 may further store information associated with other items.

The process described above may be executed by software. When the process is executed by software, a program forming the software may be installed from a storage medium onto a computer which is provided as dedicated hardware or may be installed onto a general-purpose computer capable of performing various processes in accordance with various programs installed thereon.

Various types of storage media such as those shown in FIG. 1 or 14 may be used for the above purpose. That is, specific examples of storage media for this purpose include a magnetic disk 21 (such as a floppy disk), an optical disk 22 (such as a CD-ROM (Compact Disk-Read Only Memory) and a DVD (Digital Versatile Disk)), a magnetooptical disk 23 (such as a MD (Mini-Disk)), and a semiconductor memory 24, in the form of a package medium on which a program is stored and which is supplied to a user separately from a computer.

In the present description, the steps described in the program stored in the storage medium may be performed either in time sequence in accordance with the order described in the program or in a parallel or separate fashion.

As can be understood from the above-description, the present invention is useful in processing content data.

In particular, the present invention makes it possible to process content data in a manner really intended by a user.

Furthermore, the present invention makes it possible for a user to easily and quickly make an adjustment. The parameters used in the adjustment can be expressed in simple forms and the parameters can be stored in a compressed form.

What is claimed is:

1. An information processing apparatus for converting a content data of a standard resolution signal to a high definition signal based on user input, comprising:
    processing means for processing the content data for increasing a resolution of the content data based on prediction taps and prediction coefficients;
    acquisition means for acquiring first information generated based on an input of the user for controlling the processing means;
    generation means for generating second information obtained by weighting the first information with a first weight and a second weight,
    wherein the first information indicates a spatial resolution and a temporal resolution of the content data,
    wherein when an automatic command/data is input by the user, the processing means processes the content data on the basis of the second information generated by the generation means,
    wherein the processing means calculates the prediction coefficients using the first information or the second information and generates pixel data of the high definition signal using the prediction coefficients,
    wherein the value of the first weight is cumulative and is updated by adding the second weight to the first weight each time the second weight is generated, and
    wherein the value of the second weight is determined according to the user's input operation.

2. An information processing apparatus according to claim 1, further comprising:
    input means for receiving a command/data issued by a user,
    wherein the acquisition means acquires, as the first information, an adjustment value input by the user via the input means, and
    wherein when the automatic adjustment command is not issued by the user via the input means, and when the adjustment value is input by the user via the input means, the processing means processes the content data on the basis of the first information acquired by the acquisition means.

3. An information processing apparatus according to claim 1, further comprising:
    input means operated by a user to input the control command/data; and
    control command/data input detection means for detecting a status of control command/data,
    wherein the control command/data input detection means is control operation time measurement means for measuring a time spent in the inputting of the control command/data; and the generation means increases the value of the second weight with increasing time spent inputting the control command/data.

4. An information processing apparatus according to claim 1, further comprising:
    feature detection means for detecting features of the content data,
    wherein the generation means generates second information for each feature detected by the feature detection means for the content data; and
    the processing means processes the content data using the second information corresponding to a feature of the content data detected by the feature detection means.

5. An information processing apparatus according to claim 4, wherein the feature detection means detects, as a feature of the content data, the variance of image levels.

6. An information processing apparatus according to claim 4, wherein the feature detection means detects, as a feature of the content data, the mean image level.

7. An information processing apparatus according to claim 1, further comprising:
    environmental information detection means for detecting environmental information associated with an environmental condition,
    wherein the generation means generates second information for each piece of environmental information detected by the environmental information detection means, and the processing means processes the content data using second information corresponding to the environmental information detected by the environmental information detection means.

8. An information processing apparatus according to claim 7, wherein the environmental information detection means detects, as the environmental information, the temperature in the ambient.

9. An information processing apparatus according to claim 7, wherein the environmental information detection means detects, as the environmental information, the humidity in the ambient.

10. An information processing apparatus according to claim 7, wherein the environmental information detection means detects, as the environmental information, the brightness of a light in the ambient.

11. An information processing apparatus according to claim 1, further comprising:
    information extraction means for extracting information associated with the content data,
    wherein the generation means generates second information for each piece of information extracted by the information extraction means, and the processing means processes the content data using second information corresponding to the information extracted by the information extraction means.

12. An information processing apparatus according to claim 1, further comprising storage means for storing the second information generated by the generation means.

13. An information processing apparatus according to claim 12, wherein the storage means is formed such that it can be removed from the information processing apparatus.

14. An information processing method for converting a content data of a standard resolution signal to a high definition signal comprising the steps of:
    processing the content data for increasing a resolution of the content data based on prediction taps and prediction coefficients;
    acquiring first information generated according to an input of a user for controlling the processing step;
    generating second information obtained by weighting the first information acquired in the acquisition step with a first weight and a second weight,
    wherein the first information indicates a spatial resolution and a temporal resolution of the content data, wherein the value of the first weight is cumulative and is updated by adding the second weight to the first weight each time the second weight is generated, wherein the value of the second weight is determined according to the user's input operation, and wherein when an automatic adjustment command is input by the user, the content data is processed on the basis of the second information generated in the generation step;

detecting a status of control command/data, measuring a time spent inputting of the control command/data;

increasing the second weight with increasing time spent inputting the control command/data; and calculating the prediction coefficients using the first information and the second information and generating pixel data of the high definition signal using the prediction coefficients.

15. A computer-readable storage medium including instructions which cause a computer to process content data to convert a content data of a standard resolution signal to a high definition signal according to the following steps:

processing the content data for increasing a resolution of the content data based on prediction taps and prediction coefficients;

acquiring first information generated based on an input of a user for controlling the processing step;

generating second information obtained by weighting the first information with a first weight and a second weight, wherein the first information indicates a spatial resolution and a temporal resolution of the content data, wherein the value of the first weight is cumulative and is updated by adding the second weight to the first weight each time the second weight is generated, wherein the value of the second weight is determined according to the user's input operation, and wherein when an automatic adjustment command is input by the user, the content data is processed on the basis of the second information generated in the generation step;

detecting a status of control command/data, measuring a time spent inputting the control command/data;

increasing the second weight with increasing time spent inputting the control command/data; and calculating the prediction coefficients using the first information or the second information and generating pixel data of the high definition signal using the prediction coefficients.

16. A system for converting a content data of a standard resolution signal to a high definition signal comprising:

at least one memory, coupled to at least one processor, the processor adapted to execute program code of a program comprising the steps of:

processing content data for increasing a resolution of the content data based on prediction taps and prediction coefficients;

acquiring first information generated based on an input of a user for controlling the processing step;

generating second information obtained by weighting the first information with a first weight and a second weight, wherein the first information indicates a spatial resolution and a temporal resolution of the content data, wherein the value of the first weight is cumulative and is updated by adding the second weight to the first weight each time the second weight is generated, wherein the value of the second weight is determined according to the user's input operation, wherein when an automatic adjustment command is input by the user, the content data is processed on the basis of the second information generated in the generation step;

detecting a status of control command/data, measuring a time spent inputting the control command/data;

increasing the second weight with increasing time spent inputting the control command/data; and calculating the prediction coefficients using the first information or the second information and generating pixel data of the high definition signal using the prediction coefficients.

* * * * *